(12) United States Patent
Tillotson, Jr.

(10) Patent No.: US 10,374,400 B2
(45) Date of Patent: Aug. 6, 2019

(54) DISCRETE WIRE HARNESS SINGLE OR DUAL OPERATOR WORK CENTER

(71) Applicant: John D Tillotson, Jr., Scottsdale, AZ (US)

(72) Inventor: John D Tillotson, Jr., Scottsdale, AZ (US)

( * ) Notice: Subject to any disclaimer, the term of this patent is extended or adjusted under 35 U.S.C. 154(b) by 0 days.

(21) Appl. No.: 16/133,466

(22) Filed: Sep. 17, 2018

(65) Prior Publication Data
US 2019/0089136 A1 Mar. 21, 2019

Related U.S. Application Data

(63) Continuation-in-part of application No. 16/022,496, filed on Jun. 28, 2018.

(60) Provisional application No. 62/559,934, filed on Sep. 18, 2017.

(51) Int. Cl.
| | |
|---|---|
| *H02G 1/00* | (2006.01) |
| *G05B 19/418* | (2006.01) |
| *H02G 1/12* | (2006.01) |
| *H01R 43/01* | (2006.01) |

(52) U.S. Cl.
CPC ......... *H02G 1/005* (2013.01); *G05B 19/4188* (2013.01); *H02G 1/12* (2013.01); *G05B 2219/32051* (2013.01); *H01R 43/01* (2013.01)

(58) Field of Classification Search
CPC ...... H02G 1/005; H02G 1/12; G05B 19/4188; G05B 2219/32051; Y10T 29/53243; Y10T 29/53213; H01B 13/01245
See application file for complete search history.

(56) References Cited

U.S. PATENT DOCUMENTS

| | | | | |
|---|---|---|---|---|
| 3,633,096 | A | | 1/1972 | Bollman |
| 3,907,007 | A | * | 9/1975 | Hobbs .............. H01B 13/01245 140/93 R |
| 3,946,768 | A | | 3/1976 | Fiorentino |
| 4,242,792 | A | | 1/1981 | Kirsinas, Jr. |
| 4,323,227 | A | | 4/1982 | Turek |
| 4,409,734 | A | * | 10/1983 | Baraglia ................ H01R 43/28 29/564.4 |
| 4,653,159 | A | * | 3/1987 | Henderson ....... H01B 13/01245 140/93 R |
| 4,715,100 | A | * | 12/1987 | Cross ......................... B25J 9/00 227/84 |

(Continued)

*Primary Examiner* — Michael C Zarroli

(57) ABSTRACT

A configurable modular work space for a wiring harness assembly system comprises a computerized wire harness system controller and bulk wire supplies associated with a programmable discrete wire inventory retainer.

One or more multiple wire pull-through mass terminators and a sequential wire termination apparatus are positioned proximal to a universal wire harness board, with a programmable mass terminator tooling unit cutting wire to length during a mass termination cycle. The multiple wire pull-through mass terminator leads to a first IDT connector nest, and then onto the universal wire harness board.

A universal wire harness board comprises a floating pin board assembly positioned to interface with a second IDT connector nest, and the floating pin board assembly comprises a plurality of floating pins arranged in an array, which may be individually locked in extended or retracted positions for receiving wires during assembly of a wire harness according to wire harness specifications.

15 Claims, 16 Drawing Sheets

(56) References Cited

U.S. PATENT DOCUMENTS

| | | | | |
|---|---|---|---|---|
| 5,052,449 A | * | 10/1991 | Fukuda | H01R 43/01 140/93 R |
| 5,205,329 A | * | 4/1993 | Suzuki | H01B 13/01218 140/92.1 |
| 5,492,155 A | * | 2/1996 | Nishide | H01B 13/01245 140/92.1 |
| 5,745,975 A | * | 5/1998 | Heisner | H01R 43/28 29/33 M |
| 6,169,934 B1 | * | 1/2001 | Nakayama | H01B 13/01218 29/33 F |
| 2005/0229390 A1 | * | 10/2005 | Romagnoli | B21C 47/26 29/748 |

* cited by examiner

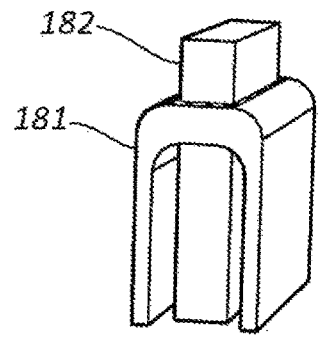
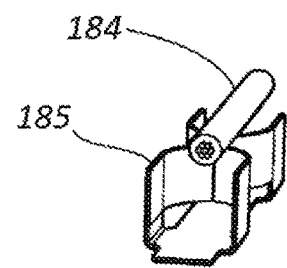
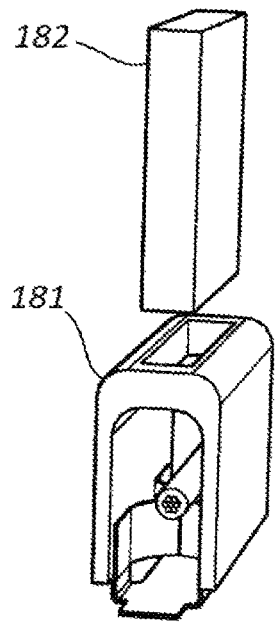
Fig. 12a    Fig. 12b
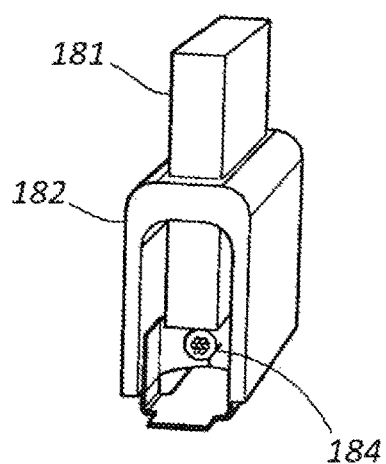
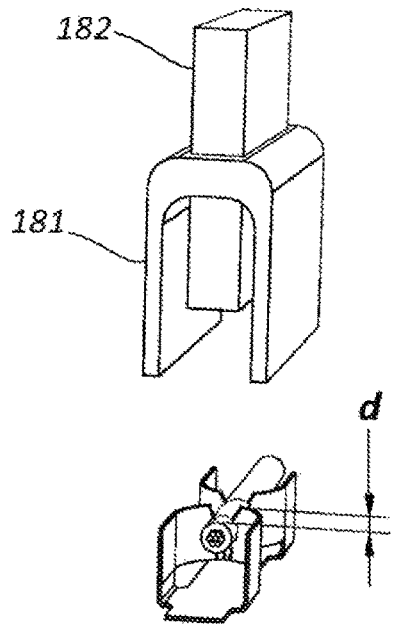
Fig. 12c    Fig. 12d

DISCRETE WIRE HARNESS SINGLE OR DUAL OPERATOR WORK CENTER

PRIORITY: CROSS-REFERENCES TO RELATED APPLICATIONS

This non-provisional utility patent application is a continuation-in-part application of US utility application Ser. No. 16/022,496 "Insulation Displacement Termination (IDT) For Mass Termination of Multiple Electrical Wire Gauge Sizes in Termination of Multiple Wire Gauge Sizes to Strip Terminal Products," filed Jun. 28, 2018.

The non-provisional utility patent application Ser. No. 16/022,496 "Insulation Displacement Termination (IDT) For Mass Termination of Multiple Electrical Wire Gauge Sizes in Termination of Multiple Wire Gauge Sizes to Strip Terminal Products," filed Jun. 28, 2018 claims the benefit of and priority to U.S. Provisional Application 62/532,352 "Insulation Displacement Termination (IDT) Design for Mass Termination of Multiple Electrical Wire Gauge Sizes in IDT Multiple Position Electrical Connector Products," filed Jul. 13, 2017.

This non-provisional utility patent application claims the benefit of and priority to U.S. Provisional Application 62/559,934 "Discrete Wire Harness Single/Dual Operator Work Center," filed Sep. 18, 2017.

The entire contents of U.S. Provisional Application 62/532,352 "Insulation Displacement Termination (IDT) Design for Mass Termination of Multiple Electrical Wire Gauge Sizes in IDT Multiple Position Electrical Connector Products," filed Jul. 13, 2017, plus U.S. Provisional Application 62/559,934 "Discrete Wire Harness Single/Dual Operator Work Center," filed Sep. 18, 2017, plus U.S. utility application Ser. No. 16/022,496 "Insulation Displacement Termination (IDT) For Mass Termination of Multiple Electrical Wire Gauge Sizes in Termination of Multiple Wire Gauge Sizes to Strip Terminal Products," filed Jun. 28, 2018 are all hereby incorporated into this application document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention generally relates to a wire harness work center for manufacturing wire harness assemblies commonly comprised of multiple wire gauge sizes pulled from bulk storage containers and assembled into completed wire harness configurations, which may then be electrically tested in place for verification of acceptable performance to specifications.

BACKGROUND OF THE INVENTION

Manufacturers of discrete wire harness assemblies must usually arrange to provide an extensive inventory of components that require high labor content to assemble in order to produce acceptable finished products to their OEM customers. Labor-intensive tasks commonly include selecting and handling correct wires types and sizes, and selecting from a myriad of loose piece components such as connector headshells, hardware, clips, terminals, all from among large numbers of bulk supplies. Other tasks include pulling wire and routing groups of wires around pegs and other such layout fixtures to establish proper lengths for each wire of a product being manufactured, inserting wires into terminal and jacket crimping and forming machines, and snapping or inserting terminated wires into proper cavities of connector or cable end headshells, or arranging groups of wires, cables, or ribbon cable onto insulation-displacement devices and mass-terminating these groups using an arbor press or some other high-force machine.

Often assembly fixtures are fitted to move on conveyor systems, and a work shift can include several different products to be made within the same work cell. Changeovers from one product to the next often require that automated machinery such as for wire cutting or stripping, or for supplying and crimping terminals onto wire ends, must be re-adjusted or re-configured.

Thus cable assembly work entails much dexterity, attention to details, fine finger work, and the ability to follow complex assembly and testing instructions, and to react correctly as these instructions are changed to follow various and flexible production schedules.

In wire harness manufacturing, opportunities for error abound, for example: mis-wiring, incomplete production steps such as failures to make a good electrical connection due to an incomplete deformation of conductive materials in a contact or terminal, incomplete compression of a connector headshell and failure of it to snap closed or to achieve proper mass terminations, or using the wrong wire gauge sizes or terminating wires to the wrong style of terminal.

Furthermore, wire harness manufacturing entails an intense amount of complex and detailed work, all of which must be executed competently and correctly. Error trapping and detection and elimination of non-conforming products from the supply chain is designed in at many check-points in the process.

Thus opportunities exist and will continue to exist for reducing labor costs by simplifying tasks, impeding or precluding incorrect actions ('poka yoke') or by ganging similar tasks and providing machines that can execute sets of similar functions simultaneously. New technologies, products, materials and methods will always import with them unforeseen opportunities for new errors and product deficiencies, but among these will always arise other opportunities to improve the tools and methods within the cable and wire harness manufacturing industry.

BRIEF SUMMARY OF THE INVENTION

From the aforementioned background it is understood that many objectives exist.

A primary objective of the invention is to arrange and provide a work cell which is an arrangement of work surfaces and areas which allow workers to plan, lay out, assemble and test wire harnesses and cable assemblies. A corollary objective of the invention is to arrange precursor components, materials, and subassemblies in an orderly and logical manner to reduce time lost when an incorrect item is selected and must be exchanged for an intended, correct item.

Another objective of the invention is to arrange and provide application specific tooling within a work station for discrete tasks such as cutting wire to length, stripping and crimping terminals to wire ends, making individual and mass terminations of wires into cable headshells, electrical verification testing, and display systems for work instructions, checklists, and camera-assisted assembly and inspection systems.

Since the largest portion of the expense in producing a wire harness assembly is in the management of so many different wires and leads, another objective of the invention is to reduce a unit cost of the harness produced in the work station by enabling mass terminations or in-gang assemblies of similar or sufficiently identical components so that a single action of an application-specific machine or tool can correctly and completely execute a plurality of similar or identical assembly steps in several closely collected locations.

A corollary objective of the invention is to eliminate where possible the step of having to strip or expose conductors in a wire end before making a permanent electrical connection to a terminal or a contact. If terminals and other hardware components can be redesigned to be more user-friendly for handling, operators may be better able to take advantage of mass termination of wires, and also increased flexibility in routing and placement of pluralities of wire sub-assemblies, and another corollary objective of the invention may be met: production and productivity improvements to wire harness board lines.

Another objective of the invention is to reduce "in-process inventory movement," such as the time expended to move a cut-to-length wire from one location to another, because reductions of "in-process inventory" in motion directly reduces the unit cost of a finished wire assembly.

The second largest portion of expense in a wire harness assembly is the facility cost of the floorspace consumed by assembly stations, work cells, and ancillary spaces such as inspection stations and staff offices. Material conveyor systems also take up considerable space, and volume requirements of each wire assembly typically require multiple conveyor systems in place that produce the same wire assemblies. Secondly, containers for bulk supplies to support production also require considerable space, such as for storage of wire barrels or bins, storage for wire assembly boards, and properly labeled bins or drawers of loose components and fixtures. Designated areas for maintenance parts, tooling prep, testing stations, and shipping areas are included as factors relating to burden rate or overhead costs. Burden rate or overhead costs also include the required labor to maintain the facilities and the handling of in-process inventories. It is therefore another objective of the invention to arrange all necessary assembly infrastructure in a smaller space and volume than current methodologies typically require and consume.

The third most expensive cost factor is the number of workers required in a work cell or area to assemble and deliver each wire-lead of every product to its permanent position on the wire harness board. Due to physical space requirements and the necessity to operate multiple conveyor systems to produce various wire assemblies, this cost factor is described as direct labor or cost per hour to produce a completed assembly. An additional objective of the invention is to reduce labor cost by enabling the required tasks per item produced to be performed by fewer workers in the work cell.

From the foregoing, there is seen a need for a revised manufacturing process for wire harness assemblies that streamline the manufacturing requiring fewer steps, less time, and less manpower. Additionally, many mass termination tools and processes can only handle one wire size at a time, and various cost savings may be achieved by using more universal application tooling capable of making mass terminations to products having mixed wire sizes.

Such tooling enables universal tooling to effect substantial cost savings over current manufacturing operations, especially if, as yet another objective of the invention, an opportunity is gained to eliminate the purchase or leasing of dedicated crimp applicator tools.

Various devices are currently available which attempt to address these challenges, although they may at best meet only one or two aspects of the totality of the requirements.

BRIEF DESCRIPTION OF THE DRAWINGS

A further understanding of the nature and advantages of particular embodiments may be realized by reference to the remaining portions of the specification and the drawings. Similar reference numerals are used to refer to similar components.

FIGS. 12a through 12d show a wire termination process for IDT terminals described in the parent application.

DETAILED DESCRIPTION OF THE INVENTION

Figure 1:
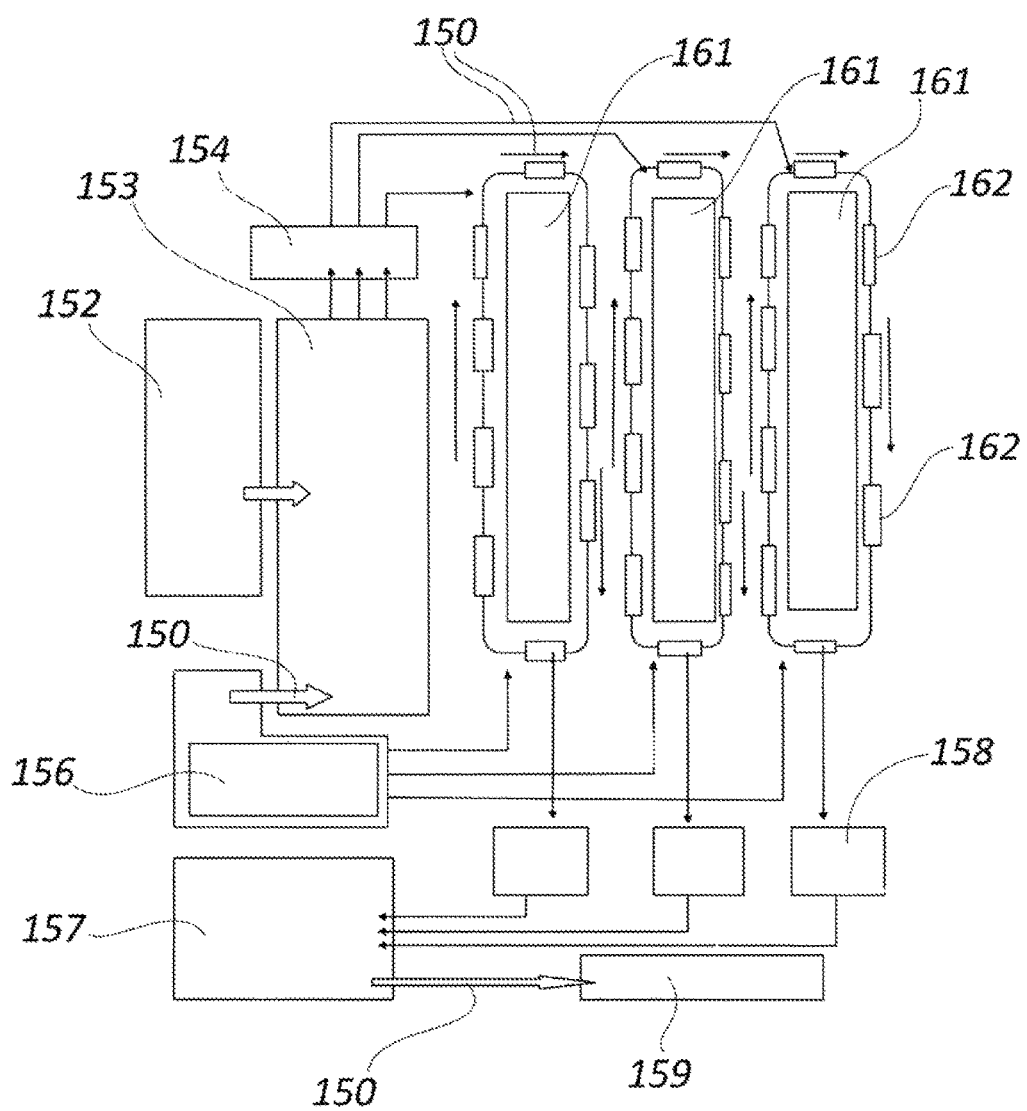
FIG. 1 shows an abstract representation of a typical wire harness assembly work cell.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this specification, the term "means for . . . " as used herein including the claims, is to be interpreted according to 35 USC 112 paragraph 6.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered nonexclusive. Also, terms such as "element" or "component" encompass both elements and components comprising one unit and elements and components that comprise more than one unit, unless specifically stated otherwise.

Also in this specification the word "wire" may be used interchangeably with the word "cable" when meaning a single strand structure comprising a solid or a stranded central conductor surrounded by an insulating coating or a jacket. A "wire" in this specification may have a solid central conductor or a braided or served strand built up from a plurality of solid conductors. Some wires have a built-up core of multiple conductors, with each individually coated by solder or a brazing material which is heated to bond the group to act as a unitary conductor. "Ribbon cable" is comprised of a linear array of individual wires having conjoined insulators to form a flat membrane or strip. Also in this specification, where the word "terminal" or its plural is used without any other adjacent word defining or limiting the scope or type of terminal, then the word applies to all types of terminals and all manners of bulk supplies of these terminals, such as side feed, end feed, and loose piece terminals.

For comparison, an embodiment of a conventional work station is illustrated in FIG. 1 as an abstract representation. Such a work station may include a conveyor routing system that may move intermittently or constantly, with operators stationed around the periphery of the conveyor routing system. The conveyor delivers wire and lead sub-assemblies to each of these work stations in plastic tubs where workers apply or connect the specific wire subassembly to the moving wire harness board passing in front of them. Several wire harness assembly cells [161] operate simultaneously. Arrows [150] indicate material flows. A pre-fabrication area [153] is where wire leads and subassemblies are prepared. Tasks performed in this area may include wire preparations, such as selecting correct wires for specification and jacket colors, pulling and cutting to length, stripping, termination, and bundling. Material being worked on in this area is included in in-process inventory [154.] Automated wire cut and strip machines may pull wire from a barrel on a continuing basis in which the wires are pulled to the correct length, stripped at wire ends, and then presented to a crimping press where stripped electrical terminals are indexed for crimping to wire ends. Each wire in the process of completion can be terminated on both wire ends, terminated on one end, or in combinations of stripping only, or otherwise terminated as required for the end use in the final assembly. From a large number of ATM (Automatic Terminating Machines) machines, each making individual wires or leads or both, these items are collected in rubber or plastic tubs and then moved to any of the wire harness assembly cells [161] or to an appropriate operator/work station. The pre-fabrication area is supported by a maintenance and repair area [152] for application specific tooling and fixtures.

Bulk stores [156] of items and components such as terminals, connector headshells, screws, lugs, and the like are positioned near the pre-fabrication area and are accessible to workers in the wire harness assembly cells. Conveying machinery operates in each work cell to circulate form boards [162] which are usually sheets of material with permanently or substantially permanently mounted pegs affixed thereupon. Wire harness boards are also called form boards in this specification.

At each work station, an operator assembles specified wires to a wire harness board, routing their wires from a starting point and then around pegs on the board and ending in some kind of fixture or connector housing contained in a fixture. At a finished end of this conveyor system, the wire assemblies are gathered or tied at juncture points before removing the wire assemblies from the wire harness boards. After removing the wire assemblies from the harness boards, the assemblies are typically moved to a testing station [158] to confirm that all wires have been properly routed to their respective places in multiple position connectors. Repairs or reassembly of wire ends are also typically done at this station. From the testing station, wire assemblies then move to finished wire assembly inventory area [157] where they can be picked up in batches and transported to a shipping area [159] for packaging and shipping to OEM assembly locations such as factories building automobiles, appliances, computer server racks, vending machines, or the like. Continuity testing hardware is made available, and all final tests are performed on site at the wire harness assembly work space prior to shipment of wire assembly products to OEMs or customer locations.

Wire and lead production can proceed at a rate of more than 3,000 wire/leads per hour, and may include tasks such as handling wires of different gauges, different lengths, different colors, or having different terminals crimped to them, and other variations in accordance with customer requirements. A significant amount time is consumed in handling wires from the time they are produced to the time they are assembled on the harness boards and finally packaged and shipped. The time defined by movement of one cut wire length from one place to another is referred to as "in-process inventory movement." Inventory retained for a long period of time has an inherent cost where return on investment is affected. By reducing in-process inventory time in the manufacturing cycle, the end cost of a completed wire assembly can be directly affected and reduced.

Use of multiple single operator work stations to produce the same finished wire harness product may lower the cost to produce the same product, with major reductions possible for in-process inventories, reductions in floor space requirements, and reductions in the number of workers required to complete assembled products.

A work cell in accordance with the invention may provide an improved and modified wire harness assembly process. In a preferred embodiment, the invention provides a modular work space for a wiring harness assembly system that may combine a computerized wire harness system controller, one or more bulk wire spool stores, a programmable discrete wire inventory retainer, universal applicators and crimping press machines for feeding and crimping reel-fed terminals, a workspace allowing multiple simultaneous pulls of wires from start to finished end locations, with programmable mass terminator tooling units to cut and mass terminate all wires at both ends into terminals and especially insulation displacement terminals (IDT) and connectors designed therefor. Preferably, all wires may be assembled onto a specifically selected form sheet (or wire harness board) that flexibly admits extendable pegs therethrough. The locations and configurations of pegs act like assembly fixtures and help workers to accurately dress and assemble wires of a harness product being produced. The features and advantages of form sheets in accordance with the invention are described in detail below. The abbreviation "IDT" for "insulation displacement termination" is often used interchangeably with the abbreviation "IDC" which can stand for "insulation displacement crimp."

Figure 2:
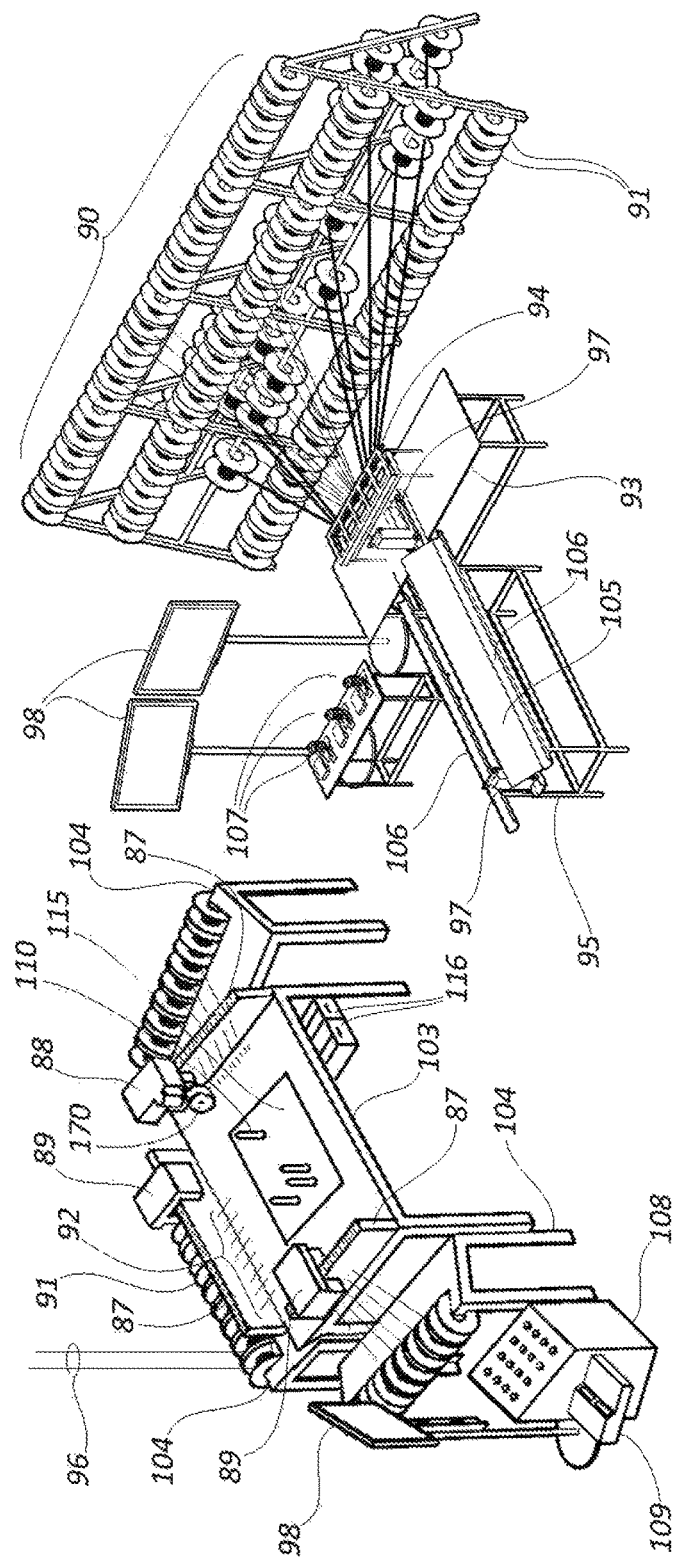
FIG. 2 shows an embodiment of a work cell in accordance with the invention.

An embodiment of a work cell in accordance with the invention is shown in FIG. 2, which depicts a single or dual operator discrete wire harness manufacturing work center. The work station shown includes termination machinery for all three major types of terminals supplied in bulk: side feed, end feed, and tape mounted. Although a work center in accordance with the invention, and its fixtures can be used for assembling wire harnesses for nearly any industry, the devices and their arrangements as disclosed in this document may offer some of their greatest benefits and improvements to wire harness assembly in the automotive industry. The work cell is a configurable modular work space where assembly tools, jigs and fixtures, and machinery may be arranged for production and verification testing of various wire harness assemblies, wherein the modules and work spaces within the work cell can be rapidly, easily, and safely rearranged for most efficient production of a product to OEM or customer specifications.

The work center is more universal in applicability in that it can mix and match different wire termination designs. Set up for side feed is different than for end feed. Set up is also often governed by specifications in an OEM or customer contract, which may impede the most beneficial arrangement and application of the invention. For example, the customer (OEM) may require a labor intensive hand crimp and visual inspection by a human operator even though an automated strip and crimp tool coupled with machine vision can accomplish the same task faster, with tighter tolerances (such as holding post-crimp dimensions and tolerances) and more reliable optical inspection. Computers may be supplied with images of maximum and minimum production limits and can be programmed to visually identify relevant features captured by a machine vision system, and they may then make pass/fail visual inspection judgements much faster than human inspectors can while not introducing expectation biases or psychological pressures to conform or to achieve production goals regardless of output quality.

IDT terminations are usually only used for wire sizes of 18AWG to 24AWG and smaller, which may represent a practical range for IDT terminals and terminating methods and equipment. The inventive IDT terminal of the parent application may expand this range to 14AWG to 28AWG.

Although bulk quantities of wire are available in spools, tubs, or boxes, in this illustration wires are shown in spools [91] arranged on a bulk supply frame [90.] Wires of various types and sizes are pulled from bulk supplies and routed to a programmable discrete wire inventory retainer [94] which registers in a movable carriage all wires called for in a product to be built. The wires may be retained by insertion into gaps of an extended helical spring as is explained and illustrated below. The wires are registered into a linear array on a movable carriage portion of the wire inventory retainer.

Computers and video display monitors are positioned at work areas and component storage areas. Video display monitors [98] are positioned in view of workers at activity stations within the work cell. Video display monitors connected to the production control computer may graphically communicate to workers that all is ready, and all machines which are production capable, or if not, what items need maintenance, adjustment, or reconfiguration. Display monitors may also indicate inventory on hand and may be part of a kanban system for more automated inventory replenishment or a heijunka system for scheduling "pitches" of work intervals comprising mixed product production. They may display step-by-step tasks, accumulated statistics, production figures, and machine vision or inspection images proving that manufacturing steps have been performed correctly. Cp and Cpk process capability tracking data may also be displayed as advance indicators of processes or equipment adjustments which may need corrective maintenance.

Cost saving benefits include the elimination of operator errors, and the ability of computer coordinated or sequenced steps to start and stop, allowing an operator to more accurately complete any manual or semi-automatic sequenced activity.

A movable shuttle [97] can travel along an axis by residing in a longitudinal channel or traveling along one or more longitudinal rails. A clamp on the movable shuttle grabs a desired wire which is presented to it by the lateral motion of a carriage of a programmable discrete wire inventory retainer [94] typically mounted to a work bench [93.] In this illustration the shuttle is depicted at two such locations, but in practice there is only one shuttle traversing a given rail system. Cost saving benefits of a programmable discrete wire inventory retainer system include a capability for multiple wire types to be inventoried at the assembly site, which reduces in-process inventory time, and time used for wire selection and lead preparation.

Once each clamp on the shuttle has grasped an appropriate wire, on command from the production control computer the shuttle travels away from the inventory retainer to a programmed, predetermined distance which defines the length of the wires as they are cut from the programmable discrete wire inventory retainer, which includes wire cutting and wire stripping fixtures or tooling. Intermediate cuts of the jacket alone, called center strip cuts, can also be executed at the carriage of the programmable wire inventory retainer. A slight drag is maintained on the wire jacket for a short period of time after the jacket is cut so that its travel is retarded as the central conductors are exposed. Once cut to length, the loose wires then fall along the sloped surfaces [105] of the presentation table [95] and collect in a trough [106] affixed to the lower edge of the sloped surfaces. For a wire presentation table having two staging troughs, one for each work cell, the shuttle has a pair of clamps so that the desired wires for each stage of selection and cutting to length can be picked up in pairs; one for each work cell.

According to an alternate embodiment in accordance with the invention, the clamp of the movable shuttle is a crimping device which may pick up a wire end presented to it by the wire inventory retainer and crimp a terminal to it before or while adjacent to the inventory retainer. The capability to manufacture a wider variety of wire lead types in a smaller workspace than in current practice creates an additional opportunity for cost savings by further reducing in-process inventory time because all wires and lead types may be manufactured in sequence. The option to make wire length changes at any time also eliminates expensive retrofitting or scrapping of already manufactured assemblies.

Figure 15:
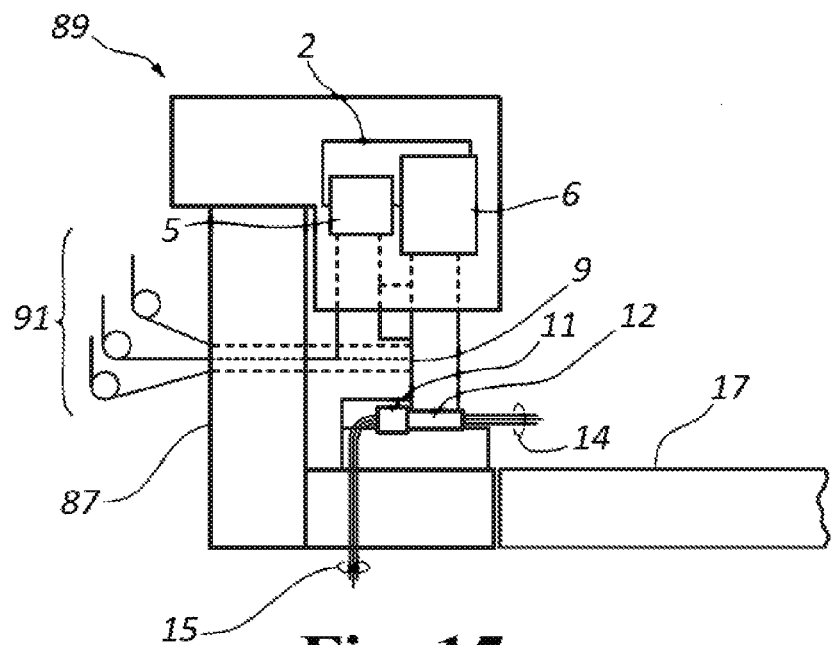
FIG. 15 shows an abstract depiction of an IDT terminator applicator machine in accordance with the invention.

The work cell may also use existing applicators (ie, application specific tooling used to terminate wire ends to terminals, or to load or otherwise prepare stripped or terminated wiring into connector headshells,) that are configured to crimp terminals onto wires, but may also use tooling designed to bypass or eliminate a crimping step and which is instead configured for mass termination by "flat-rock" tooling or by sequential termination by the roller wheel as described by FIG. 15 below, or "flat-rock" tooling as described in parent application Ser. No. 16/022,496 as referenced above and as shown in FIG. 15. In this figure three such discrete wire termination stations [107] are arranged on a work bench.

Discrete wire termination stations may be configured to process many types of wire terminals, including but not limited to end feed terminals, side feed terminals, loose terminals, and tape mounted terminals. Jigs or alignment fixtures locate interchangeable machines at dedicated locations. Cost saving benefits include that the use of universal applicator tooling may eliminate a need to purchase or lease dedicated application tooling, and manufacturing time savings during setup or to transition from one terminal strip to another. In these locations a universal crimp applicator may enable setup time savings when changing terminal strips from one type of strip or terminal to another.

Each of the three work stations consists of a crimping press with quick-change applicator or "quick-change" compatible crimp application tooling. According to one configuration in accordance with the invention, one press set-up may be configured to process side feed strip terminals, a second may be configured to process end feed terminals, and a third may be configured to process mylar tape fed insulated lugs, also known as closed-barrel crimp terminals. Press set-ups for side feed terminal strips and mylar or "Type M" terminal strips employ crimp applicator tooling of a standardized or universal type, meaning that typically a set-up gage tool is the only tool needed for configuration and adjustment for the machine to be able to process most styles terminals used in the industry.

Quick-change tooling for processing of all sorts of insulated "Type M" colored terminals may be performed at any of these locations within the work cell. As a fully mechanical type applicator tool, the mylar strip carrying the various terminal types is separated from the terminal being crimped during a down-cycle of a press actuation. On the up-cycle of the press, the mylar strip is indexed to the next crimping position. The third module setup may also be configured and dedicated to process end-feed terminal strips. The press and applicator type may feature the same quick-change universal mounting features as on the other two press/applicator set-ups.

For convenience in predicting construction time for a wire harness, each wire is assigned a "type" based on what kind of treatments are required at the wire ends, such as stripping conditions, or terminals to be applied, and may also specify intermediate wire operations such as center stripping. A non-exhaustive list describing many of the wire types that can be processed within a work cell in accordance with the invention are listed in Table 1 here below:

TABLE 1

Partial List of Wire Types for use in
"DISCRETE WIRE HARNESS SINGLE OR DUAL
OPERATOR WORK CENTER"

| | |
|---|---|
| Type A: | Cut, strip, and terminate first end, assemble on jig; second end has IDT termination |
| Type B: | Cut wire and assemble on jig; both ends have IDT terminal |
| Type C: | Hand Pull Wire and Lay aside (for next operator) |
| Type D: | Hand pull wire, cut-off and assemble on jig; both ends have IDT terminations for short wires |
| Type L: | Hand pull wire, cut-off, strip, and lay aside for conventional crimp termination (both ends;) at least one end to be doubled |
| Type F: | Hand pull wire, cut, strip, and terminate one end; to be doubled onto other end |
| Type G: | Cut, strip, and hand terminate twisted pair (one end;) other end gets IDT termination |
| Type H: | Cut twisted pair and assemble on jig; all ends get IDT terminations |
| Type J: | Cut and strip two ends, terminate two ends, and assemble wire on jig |
| Type K: | Pull wire, center, strip; pull wire, center, strip, etc. Fold wire and terminal; double terminate ends |
| Type L: | Cut and strip two ends; terminate one end, solder other end and assemble wire on jig |
| Type M: | Pull wire, center, strip; pull wire, center, strip, etc. Fold wire and terminate; terminate one end, solder other end |

Note that a "Type F" wire in the above list has no relation to the term "F crimp" used elsewhere in this specification. Another example type of wire used for multiple-pull assemblies is referred to in this specification as a "type N" wire as shown in Table 2 below.

TABLE 2

TYPE "N"—MULTIPLE PULL WIRES ON FORM BOARD:

| No. Wires | PU/Pull | Jig | Position Ends |
|---|---|---|---|
| 1 | .100 | .055 | .050 |
| 2 | .125 | .065 | .100 |
| 3 | .160 | .070 | .150 |
| 4 | .165 | .075 | .200 |
| 5 | .170 | .080 | .250 |
| 6 | .175 | .085 | .300 |
| 7 | .180 | .090 | .350 |
| 8 | .185 | .095 | .400 |
| 9 | .190 | .100 | .450 |
| 10 | .200 | .125 | .500 |

In this table above, the first column "No. Wires" represents a number of wires to be pulled simultaneously (i.e, "multiple pull") in a wire harness assembly step. The second column "PU/Pull" lists a time in seconds achievable with a work cell in accordance with the invention, for an operator to grab the selected number of wires as a group. The third column "Jig" represents, with a work cell in accordance with the invention, a time in seconds required to dress this group of wires around a single form board pin. The rightmost column "Position Ends" represents a time in seconds achievable with such a work cell for an operator to position wire ends of the group at a staged location for termination, such as into a fixture illustrated in FIG. 5. Thus an estimate of time required to complete a wire harness comprising a given number of wires may be calculated as the sum of the three timing figures in columns "PU/Pull," "Jig," and "Position Ends" for a simultaneous multiple pull of a given number of wires in the leftmost column. Furthermore, construction of type "N" wires as defined here may proceed most efficiently on work bench [103] using the floating pin form board described below, while harnesses using other types of wires may be constructed using the discrete wire termination stations [107] as arranged on another work bench.

According to another embodiment within the scope of the invention, the three wire terminators may be sequenced separately by a production control computer. Two of the three may be designated as mass termination tooling for IDT connectors. The third wire terminator may then be set up to terminate either loose or strip terminal fed IDT terminals. The use of both mass termination terminators in processing "N" type wires may enable another significant cost savings in the manufacture of discrete wire harness assemblies.

"N" type wires are processed as a simultaneous multiple pull of wires from one side of a bridge wall location to another. Multiple wires are jigged into holding positions after routing of all wires have been placed around designated floating pins and into their ending positions. Two mass termination cycles are initiated as a semi-automatic sequence independent of operator manual step instructions. Each terminator locates on IDT connector nesting tooling, then completes the mass termination cycle, and finishes with cutting wire ends. When the mass termination terminators have completed their semi-automatic steps, wire lengths will have been determined.

"Modularity" standardizes the way by which components fit and interact together, especially physically and mechanically, but in the context of the invention, also electrically. A product is "modular" when there are no unpredictable elements in the design of its parts, especially in its exterior shape and in the predetermined location and features for mating or assembling the product into or onto a larger entity in which all modules fit together and work together. Some industry standards and popular mounting base formats are common enough that fixturing on a work bench or work surface allows for quick-change applicators all sharing the same footprint. One such example is a 138 mm shoe length promulgated by the AMP (Aircraft Marine Products) company and copied by many of its competitors of its time.

Applicator machines are available to draw terminals provided in bulk spools and to receive wires to be terminated. Typically a wire is inserted to a depth controlled by a stop, and then the machine presents the wire end to a terminal and crimps a number of wing-like tabs around the wire. Some of these tabs make permanent physical and electrical contacts with conductors in the wire, and others make physical compression contact with the jacket or insulator of the wire so the terminal can better resist getting pulled off the end of the wire.

One common configuration is called an F-crimp, having longer crimp wings at the end of a terminal for grasping a wire jacket, and shorter crimp wings spaced partway between the jacket crimp wings and the rest of the terminal. The two sets of crimp wings resemble the letter "F" when viewed from a particular angle. The crimp operation usually takes place during a downstroke of the machine, and during the upstroke the terminated wire is released from the machine and the next terminal to be crimped is fed or indexed into position.

Each of these crimp operations require adjustable tooling so that each machine can process the widest possible range of terminal sizes and styles and can also process a wide range of wire gauge sizes, so as to minimize the number and types of machines required to be on hand or in stock. Some adjustments, such as crimp heights, are made by means of staged series of adjustable hardware such as lead screws or set screws operating concentrically or in parallel so that, for example, a first gross adjustment is made on a first affordance, which itself mounts a second adjustment affordance operating on a finer scale, with the second mounting a third affordance operating on an even finer scale of adjustment. One adjustable applicator of this type uses three coaxially coupled disks on increasingly finer thread pitches.

The work table layouts and the locations of application tooling machines mounted thereon are modular in that the application tooling machines, jigs, and other fixtures as arranged for a particular wire harness to be produced are modular, because they can be interchanged when it is time to cut over to production of a new product. End feed, side feed, and wheel-insertion IDT components and machinery may be swapped out rapidly and repeatably. Similarly, during production changeover, bulk wire can be cleared from the programmable discrete wire inventory retainer, and the correct selection of wires for the new product may then be staged in the inventory retainer.

The programmable discrete wire inventory retainer system provides a unique advantage over conventional wire harness manufacturing systems in that all wire types may be manufactured at the designated wire harness assembly location. This improved process of placing into inventory finished wire or lead components directly from the wire harness assembly location may drastically reduce the instances of in-process movement of wire or lead components before shipment of finished wire harness assemblies to customer or OEM facilities.

When components and fixtures are designed to handle the broadest ranges of wire or component sizes, or are designed with modularity in mind so that they can be rapidly exchanged with tooling able to process the next task to be performed at the same location, the total flexibility of the production capability of a work cell in accordance with the invention may be greatly enhanced over conventional arrangements. Although not infinite in scope, the general and versatile production capability of equipment arrangements in accordance with the invention are sufficient that the inventor includes the word "universal" in the name of the invention.

Besides machinery for terminating one end of a wire at a time, production improvements can be achieved by collecting groups of components having a common next assembly step in one location, or in an organized array such as a linear array, so that a single operation upon the area where the components are collected can perform the next step on the entire collection of units as required. One example is the insertion of a set of terminated wires into a connector headshell to a partial snugness, followed by a single act of an application tool which fully seats all contacts at once. Typically, when handling groups of wires having different sizes, each wire size has its own sized terminal or contact, and when using typical equipment these may require specific setups for each type and size of wire and terminal to be processed.

A more "universal" solution such as an arrangement in accordance with the invention may be capable of processing a broader mix of wire sizes and terminals using a smaller inventory of tooling and fewer separate documents for setting up and maintaining each of these tools. In the aircraft, automotive, and medical industries especially, quality control documentation and production records are often required for every unique process and unique component processed in a work area. Thus even the elimination of one or a few protocols or individual part numbers contributes to a substantial simplification of documentation and quality control tasks, and this improvement directly reduces the cost per item produced in a work cell arrangement in accordance with the invention.

Returning to FIG. 2, wire harness assembly is performed on a dedicated work bench [103.] Typically wires are dressed and routed to form a harness using a form board which includes a plurality of pegs [110] to direct wires into the final desired shapes and lengths. An improved wire forming pegboard system and frame in accordance with the invention is be described in FIGS. 7a-7h below. In this view, the mylar sheet [115] and pegs [110] are only shown on the work bench to identify the location where this work is to be performed. The improved form board device is explained further below.

The work bench [103] has three side walls [87] attached along its perimeter, and mass terminators [88, 89] that are motor driven and slideably coupled to the side walls, and that operate on any or all wires pulled through the walls. A side wall may also be called a "bridge wall" especially if it further comprises a rack or spaced array of traction features along its top for a motor-driven mass terminator to use while traversing a length of the wall. One device shown is a roller crimp sequential terminator for IDT strip fed terminals [88] mounted on a side wall [87] and having a roller [170] as detailed further below, and the other two are programmable mass terminator tooling units [89.] The terminators execute sequential operations controlled semi-automatically, with each of the three terminators cycling independently. While semi-automatic mass wire termination sequences are going on, the operator can finish the assembly by tying junction points in place, attaching labels or fixtures, and other tasks as required to complete the assembly process.

Figure 9:
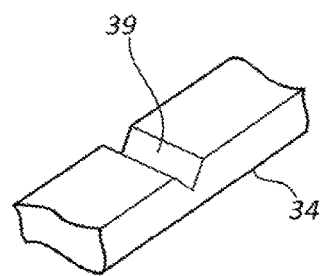
FIG. 9 shows a tail section of a terminal or contact having a notch indented or skived into the material.

A process for mass termination of in-line IDT connectors may comprise a first step of inserting each wire into its respective terminal of a gang of terminals attached to a single carrier strip, then after all electrical interconnections have been made, a ram operation inserts all terminals into a connector headshell as a gang, and then a flexing motion may be used to crack the terminal carrier strip off from the inserted terminals, especially if the carrier strips include skives (See [39] of FIG. 9.) Also, connectors designed to receive a linear array of terminals on a pitch "p" may receive a stack of "n" terminal strips where the pitch of the terminals on the strips is "n" times "p."

Each sidewall includes a plurality of apertures through which various wire ends [92] are pulled from local bulk storage spools [91] stored in local frames [104.] An alternative to nearby spools of wire is to suspend local bulk wire storage, such as a store of spools, above the work area and to lead the descending wires [96] through fairlead pulleys and then through the apertures in the sidewalls attached to the work bench. Soft clamps paralleling or incorporated in the side walls allow an operator to grab and pull wires in groups. The use of side wall mounted, moveable wire terminators abet a number of cost savings, including where IDT connector designs capable of terminating a wide range of wire sizes in the same size terminal can be employed. In a mass termination application for type "N" wires, during a simultaneous multiple pull of diverse wire sizes from a first bridge wall location to a second bridge wall location, all individual wire lengths may be determined simultaneously. In other words, the constraints of producing these wires to length separately or producing them from the discrete wire inventory retainer are eliminated, and cycle time to mass terminate several wires in one stroke may proceed much faster than terminating one wire at a time in a crimping press applicator. In this situation as before, when cycle time and in-process inventory can be reduced, unit product cost can be directly reduced.

Also, instead of cutting wires to length elsewhere and transporting cut lengths by means in which they become unsorted in transit (such as by bucket,) each wire is cut to length in situ, which may reduce the opportunity for assembly errors such as mis-wiring.

The computerized wire harness system controller is a central computer for serving and accumulating production data and for sequencing the manufacturing steps of the wire harness product to be built and may be housed within a console [108] having a control panel. The control panel includes annunciators, display lamps, controls such as buttons or switches which may also be illuminated. The controls at this console also operate the side wall terminators and also control the wire harness inventory retainer. Also attached to the console is a sequencing controller [109] which incorporates the keyboard used for alphanumeric input to the central computer. This controller also allows manual overrides for any automated process controlled by the central computer. Manual overrides to automated processes are usually used for harness rework operations, or for unique or infrequently required deviations from the production protocols in effect. Optionally, the keyboard may be a part of the console, but in either preferred construction, either the sequencing controller or the console may be used for receiving commands from an operator for overriding automated assembly steps. An example of these might be batch orders of 50 harnesses in which 49 are identical but one of the 50 differs from by having one particular yellow 18AWG wire cut 6 inches longer than the rest. Rather than change over any set-up sequences in the production program, for this case it may be more efficient and expedient to produce the 49 cables to order, and then partway into the production of the 50th, a simple override is entered so that the additional length of that particular yellow 18AWG wire may be pulled and dressed, and then the remaining work on that 50th harness is completed.

Co-processing work routines allow an operator to attend to certain non-routine tasks such as managing exceptions, while programmable tasks such as 'pull to length and cut' are proceeding automatically and correctly.

Also provided on the main assembly work bench are connectors and ground leads or ground terminals and the like which are all complementary to the connectors and leads of the wire harness product being built in the work cell, typically made available in bins or receptacles [116.] The work bench may further comprise at least one receptacle for storing components such as terminals, connectors, connector headshells, or other hardware such as screws, lugs, wires, tie wraps, or identification tags. When mechanical assembly is deemed correct and complete, connectors and leads of a wire harness are connected to their respective mates and energized for a diagnostic or acceptance test.

A typical testing procedure is to sequentially test each wire or lead component for continuity, followed by testing all multi-position connectors. More complex testing of wire harnesses, especially those which include active components, require more sophisticated test circuitry and protocols. Once testing is complete the wire harness assembly is removed from the harness floating pin board and is ready for shipment.

some industries, safety specifications require that at least one cable end, connector, or headshell is placed in a cutoff machine so that if a cable fails an electrical or diagnostic test it is cut apart so that it cannot be reworked or repaired. In these industries, only cable harnesses which are made correctly in the first place are allowed to continue to downstream manufacturing or OEMs. Testing of wire assemblies is an ongoing process since each wire is terminated at both ends and immediately tested in its respective fixture or retention site. When testing has been completed for the completed wire harness assembly, it can be moved directly to the shipping area.

Compared to conventional testing of finished wire harness assemblies at dedicated test benches, the cost savings of immediate continuity testing at the floating pin form board assembly work bench [103] exists because there is no in-process delivery of moving a completed wire harness assembly from its assembly location site to a testing location site. Also, should a product fail in testing, corrective action at the manufacturing location (if permitted) may eliminate in-process inventory time lost by moving a cable to a rework area, testing the rework, and then re-integrating it back into the supply chain.

To complete the process, tie wraps, ID tags, and electrical testing are completed. The completed wire assemblies are then moved to a packaging station at the production assembly store. In a process in accordance with the invention, there are eight in-process movements of wire or lead components before wire harness assemblies are packaged for shipment. The typical conventional process may have 15 such movements. Thus an efficiency improvement of around 53% over conventional operations is achievable using a work cell in accordance with the invention.

System design may reduce or even eliminate in-process inventory as all components selected for assembly to a specific wire harness are stored and used at the wire harness single or dual operator work station, including terminals of various types, wires, connectors, tie wraps, identification tags, and all other items and components. Also unique to this work cell system is that all methods of wire termination are brought to the assembly site for use in creating any product in conformance with OEM or customer requirements. Optionally the work bench may be fitted with one or more material bins or receptacles which may store loose components such as connectors, connector headshells, lugs, barrel crimp terminals, other loose terminals, screws and other hardware, lengths of wire, tie wraps, identification tags, hand tools, and handheld diagnostic instruments such as continuity testers or multi-meters, so that commonly used items for assembly, testing, or repair can all be close at hand to the assembly site.

As a summary of the overall work cell, the proposed method and apparatus for improved production process efficiency include a number of innovations. The new manufacturing components include a floating pin board assembly comprising a plurality of pins arranged in an array, a specialized table for collecting wires as they are cut to length, a control panel, one or more computer displays and an underlying computer system; a programmable discrete wire inventory and dispensing module, strip terminal reel and crimping presses or terminal applicator stations, and improved IDT termination tooling for the inventive terminals of the parent application.

The revised manufacturing work cell features a number of improvements and innovations for reducing costs and increasing efficiency. These include a modular work station utilizing a single operator to produce completed and tested wire assemblies. The conventional and often bulky or heavy harness assembly board is replaced by a universal assembly board unit system adaptable for easy swap out of assembly components and arrangements to produce other wire assemblies meeting different requirements. A floating pin design for a universal assembly board unit allows for further production flexibility because the board can be easily reconfigured to accommodate numerous wiring harness products.

Figure 3:
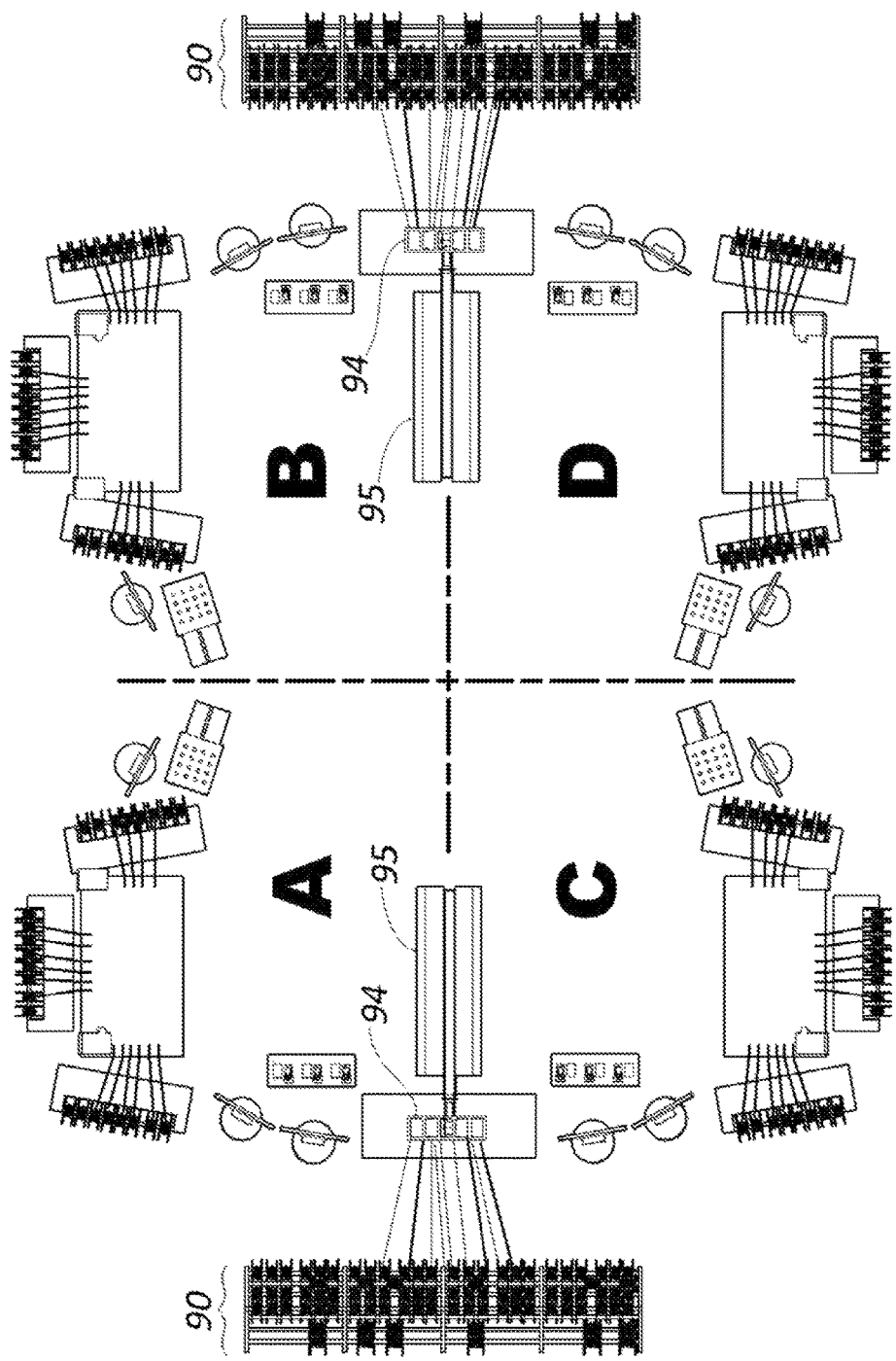
FIG. 3 shows four work cells symmetrically conjoined so that some equipment is shared among adjacent work cells.
Figure 4A:
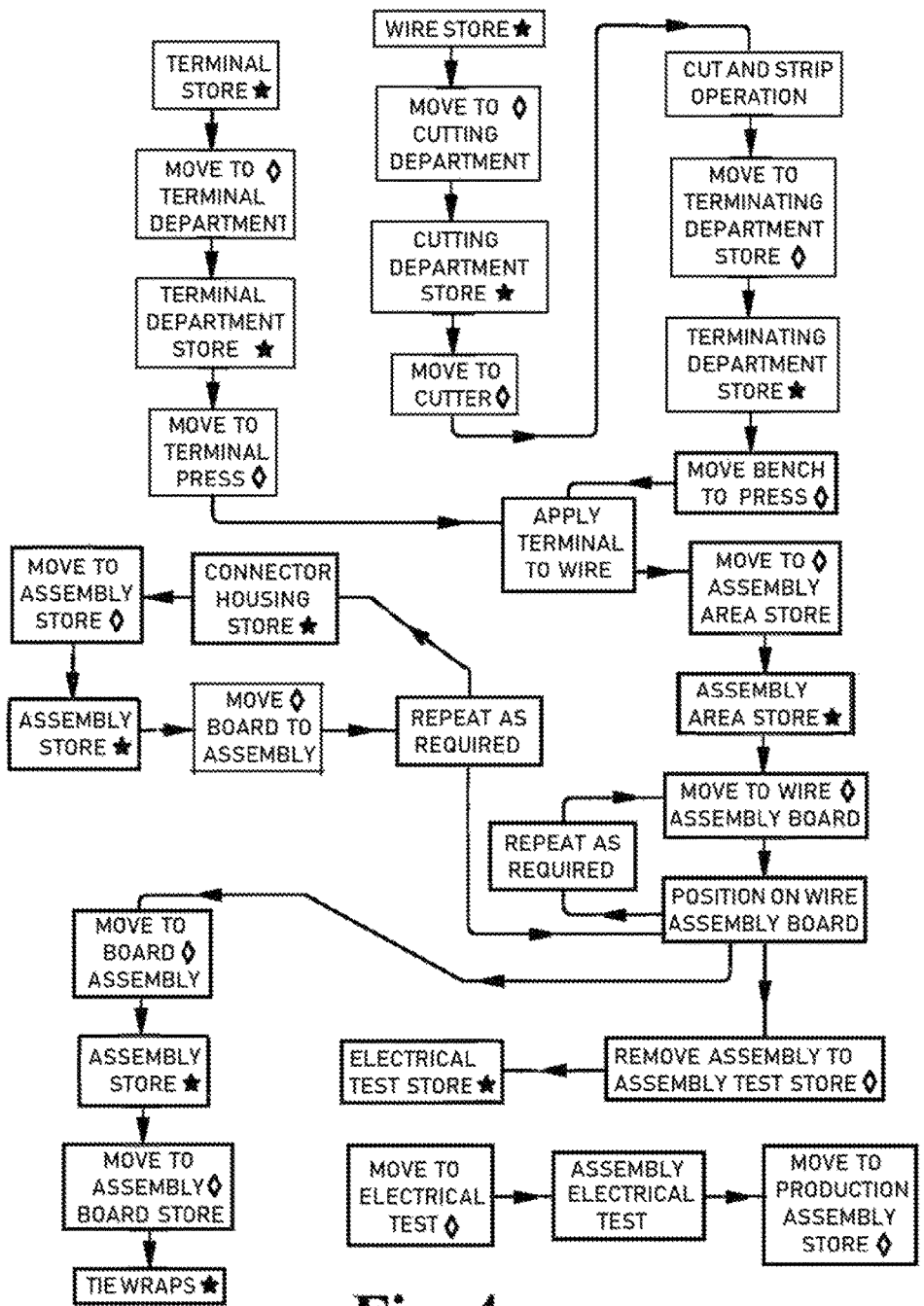
FIG. 4a shows a flow chart of steps of a typical wire harness assembly operation.
Figure 4B:
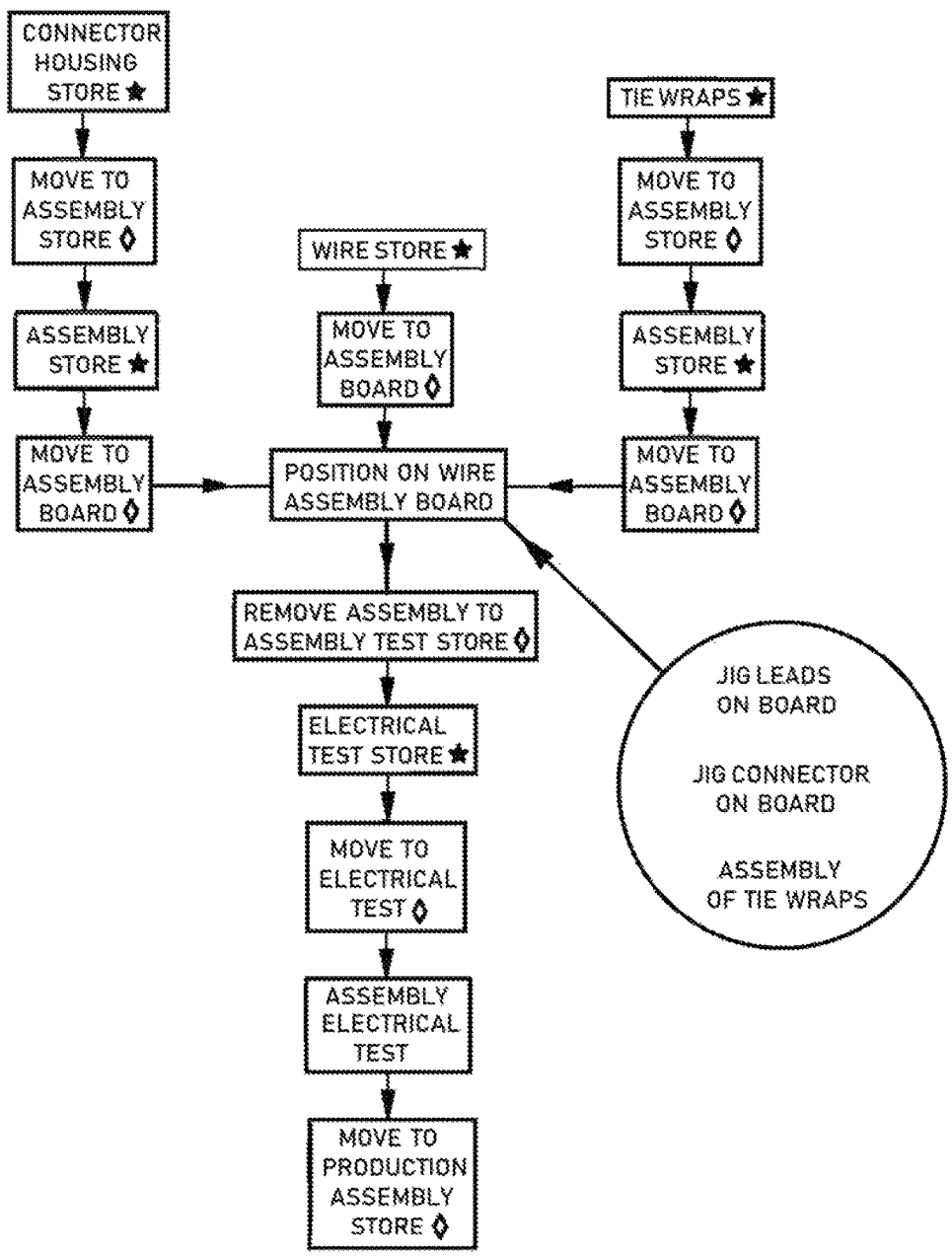
FIG. 4b shows a flow chart of steps of a wire harness assembly operation according to an embodiment of the invention.

FIG. 3 shows four work cells [A,] [B,] [C,] and [D] symmetrically conjoined so that some equipment is shared among adjacent work cells. In particular, bulk supplies of wires in spools arranged on a bulk supply frames [90] feed wires to programmable wire inventory retainer systems [94] that each serve two adjacent cells. Adjacent work cells are symmetrical to each other, and the presentation tables [95] which each serve two adjacent work cells are also symmetrical. A work cell system in accordance with the invention may consist of a single cell, or alternatively this modular unit can be set up in a two-cell production assembly area where wire selection occurs from a common store. A two-cell production system can be scaled up to a four-cell assembly area where wire selection comes from two different sources. The adaptability to produce wire assemblies using four operators in a four-unit assembly system could obviate up to three conveyor assembly areas of FIG. 1 while producing a comparable number of completed wire assemblies per hour. The space required for this four-cell assembly area may be about 1,000 square feet. There would not be any need for advanced transit manufacturing (ATM) wire lead making infrastructure, or the space required to provide this capability. Direct labor required may be reduced by more than 70%, in-process inventory movement may be reduced by more than 60%, and manufacturing floor space affecting the burden rates may be reduced by more than 900%. FIG. 4a shows a flow chart of all the steps of a typical wire harness assembly operation lacking the improvements afforded by the invention. FIG. 4b shows a flow chart of the steps of a wire harness assembly operation according to an embodiment of the invention. Blocks which include a star (★) denote stations where items are considered to be in inventory. Blocks which include a diamond symbol (◇) denote material in motion and in-process inventory. In comparing the conventional process of FIG. 4a to the improved process of FIG. 4b, it is seen that the conventional process includes 15 in-process inventory moves while an improved and simplified process in accordance with the invention includes only 8 in process inventory moves, which represents a reduction of around 47%.

Figure 5:
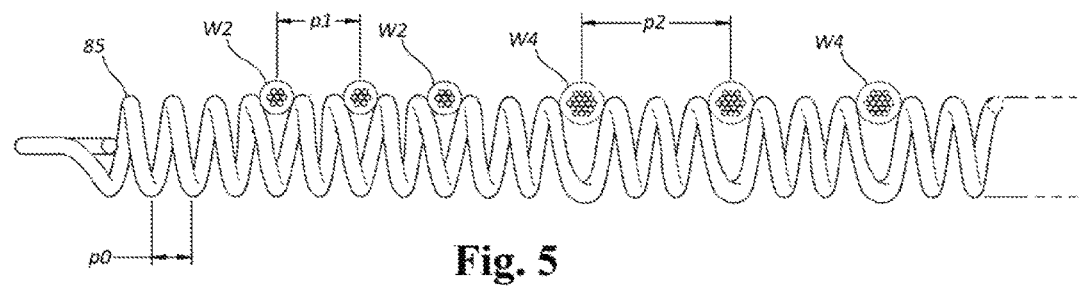
FIG. 5 shows a helical spring used to retain wires at various pitches between its coils.

FIG. 5 shows a helical spring used to retain wires at various pitches between its coils. The spring [85] secured at both ends and extended so that the helix spreads to a substantially uniform pitch p0. As an assistance for placing wires of various sizes in position for mass termination, the extension of the spring can be set so that for wires of multiple pitches p1 and p2, etc, the pitch of the helix is set to at or near the largest common denominator of the pitches to be terminated. For example, if signal wiring of a size [W2] is spaced at 0.060 in apart (p1) and power wiring of a size [W4] is spaced at 0.090 in apart (p2,) then the spring can be stretched so that the coil pitch and its openings between the coil reside on a pitch p0 of 0.030 in apart.

A fence or a wire stop ahead or behind the extended helical spring may be used to set the longitudinal location of the wire end with respect to the spring. Wire-grabbing fixtures may be adjusted so the fence acts as a wire-end reference, so that the grabbing fixture may accurately position a wire end in a terminating location, or may insert a wire end to a known depth inside an application specific tool such as a terminal applicator or a wire stripping machine.

Figure 6A:
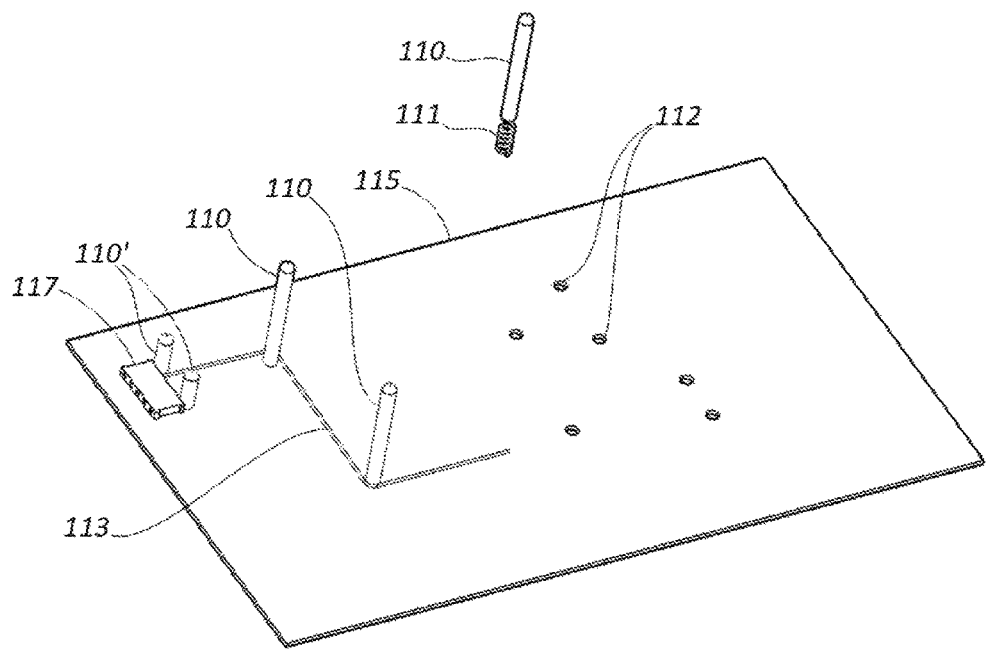
FIG. 6a shows an embodiment of a form sheet in accordance with the invention.
Figure 6B:
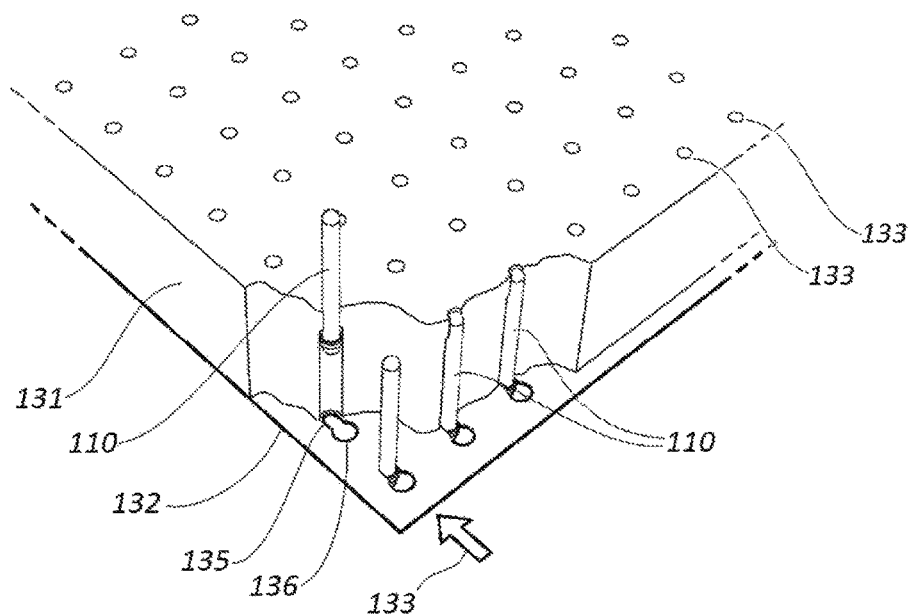
FIG. 6b shows a portion of a form sheet work table in accordance with the invention.

FIG. 6a shows an embodiment of a form sheet [115] in accordance with the invention. Form sheets may be made preferably of mylar or of other translucent, clear, or opaque sheet materials selected to endure industrial use. In this specification, "mylar" is used only to connote particular material properties of a form sheet, and any material suitable for use as a durable and flexible membrane is encompassed by the word "mylar" as used here. A work table presents a work surface and may also include a form board assembly having a standardized array of pegs [110] retracted and latched in silos at or below its work surface. Each peg may have a compressed spring [111] beneath it so that when latches are released they will be free to rise above the work surface unless otherwise impeded. Further details of an embodiment of a latch and release mechanism are illustrated in FIG. 6b.

The form sheets include holes [112] at selected locations so that pegs aligned with the holes pop up through them and are available for use as positioning aids and wire routing aids. Other pegs in the work table which are not aligned with any holes remain trapped beneath the form sheet.

The pegs may be of various lengths or they may include stepped diameters so that different sized holes in the form sheet allow the pegs to pop up or "float" to different heights depending on their mode of assisting in assembly of a wire harness. In this figure as an example, a connector headshell [117] is positioned to abut two shorter alignment pegs [110'] which may also be stepped pegs caught at a lower extension height as described. Other pegs arise to their full height through holes in the form sheet. A strand of wire [113] is shown inserted into the connector head shell (with either a snap-in terminal having been applied to the end of the wire, or the wire being received into an IDT contact within the connector,) and as shown the wire is lead around two of a plurality of pegs. In practice the other end of the wire may be terminated with a lug if left loose or as a "flying lead," or it may be routed and wound around other raised pegs to be installed into another connector by means of a crimp terminal or an IDT contact or the like.

Form sheets may be stored in the work cell in cabinetry or shelving or other organized filing means. Because form sheets in accordance with the invention are sheets of light and easily handled materials, they are a superior improvement over conventional form boards which are commonly made of thicker, bulkier, and heavier materials such as perforated Masonite, plywood, or thick plastic or metal plates. This improvement may enable greater workforce diversity by allowing the hiring of persons having modest upper body strength, which is a wider possible applicant pool than the set of persons capable of manipulating bulky and heavy boards.

Also, typical form boards not in accordance with the invention may include permanently mounted pegs or threaded sites where pegs are attached in preparation for use. Both of these current practices lack the compact and convenient storage utility of the perforated sheet materials in accordance with the invention, because boards with permanently installed pegs can only be stacked as closely as the protrusion height of the pegs allow, and boards with peg installation sites consume laborer's time for installing and removing pegs as production is changed over from one product to the next.

Form sheets in accordance with the invention may also include graphic markings to assist workers in positioning components and routing wires, and may also include identifying texts, other identifying indicia, and bar codes or grid codes for identification of the sheet and its associated product by machine vision. Once a form sheet has been identified, verification protocols may be retrieved by computer which may electronically interrogate and confirm that all active modular tool stations are present, properly oriented within the workspace, and properly configured to produce to specification.

The improvement in storage density of sets of perforated sheets in accordance with the invention as compared to stacked-up peg boards is substantial, and the labor costs of set-up saved by automatic pop-through pegs versus other manual means of installation and removal are a second substantial cost reduction which directly contributes to reduced unit cost per product assembled in a work cell in accordance with the invention.

FIG. 6b shows a portion of a form sheet work table [131] in accordance with the invention which includes an array of extendable and retractable pegs [110] which can be driven upwards from below by means of a spring, or pneumatic pressure, or solenoids. The work table thickness may be at least as thick as the excursion distance of the pegs. The pegs reside in silos [133] and have a rounded tip, a first diameter, and a stop feature or attached component near the bottom end opposite the tip, and this stop feature or component has an outer diameter greater than the first diameter of the peg.

In a mechanical embodiment within the scope of the invention, beneath the thickness of the work table is a slidable latch plate [132] which includes an array of keyhole slots complementary to the array of silos in the work table. The keyhole slots have a first diameter [135] slightly larger than the first diameter of the peg, and a second diameter [136] slightly larger than the stop feature or component at the bottom end of the peg. The plurality of floating pegs are arranged in an array and retained in a retracted position while the keyhole slots in the latch plate are positioned such that the larger diameter stop features or components of the array of pegs are all trapped beneath the smaller diameter portion of the keyhole slots.

When the latch plate slides in a direction indicated by arrow [133] the larger diameter portions of the keyhole slots slide into concentricity with the pegs, releasing each peg to rise to its extended position. In this figure the lifting spring [111 of FIG. 6a] is omitted. As stated elsewhere, air pressure or magnets may also be used to apply a lifting force to a peg which by virtue of being aligned with a hole [112] in a form sheet, is free to rise into its extended position.

Figure 6C:
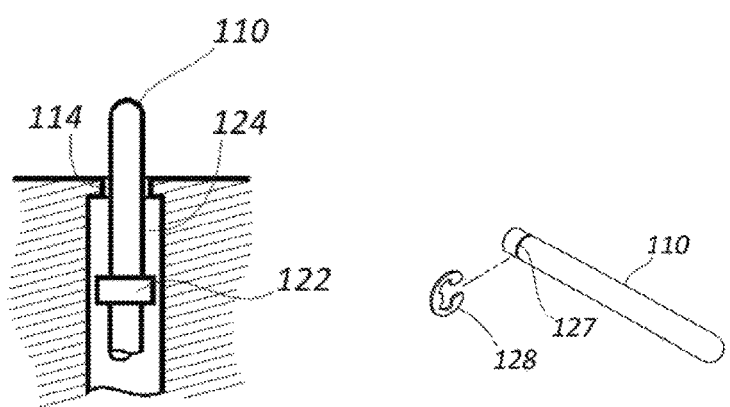
FIG. 6c shows a cross section of a silo and peg in accordance with an embodiment of the invention.
Figure 6D:
FIG. 6d shows an alternate embodiment of a peg assembly in accordance with the invention.

FIG. 6c shows a cross section of a silo and peg in accordance with an embodiment of the invention. Each silo has a main diameter [124] and a smaller throat diameter [114] which is slightly larger than the peg [110] diameter. In this embodiment the peg has a larger diameter stop feature or bead [122] which is sized to slide within the silo but is larger than the throat diameter. The peg, when impelled from below, will rise to an extended position with the stop feature abutted against the constriction of the throat. According to an alternate embodiment of a peg assembly shown in FIG. 6d, the peg [110] has a groove [127] turned near its bottom which accepts a snap ring [128] of a larger external diameter which is selected to slide within a silo and is larger than the throat diameter so it will act as a stop once the peg has reached its extended position.

Figure 6E:
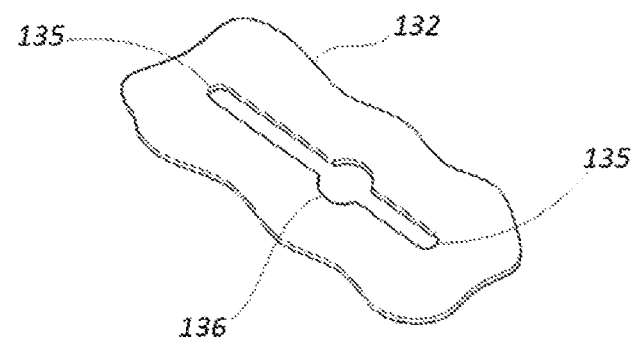
FIG. 6e shows an alternative embodiment of a slot for a sliding latch plate in accordance with the invention.

FIG. 6e shows an alternative embodiment of a slot for a sliding latch plate [132] in accordance with the invention. In this embodiment a slot is elongated so as to pass through both sides of a central round aperture section, and terminates with rounded ends of a first diameter [135] slightly larger than the first diameter of the pegs. The diameter of the central aperture is a second diameter [136] slightly larger than the stop feature or component at the bottom end of the peg.

Figure 6F:
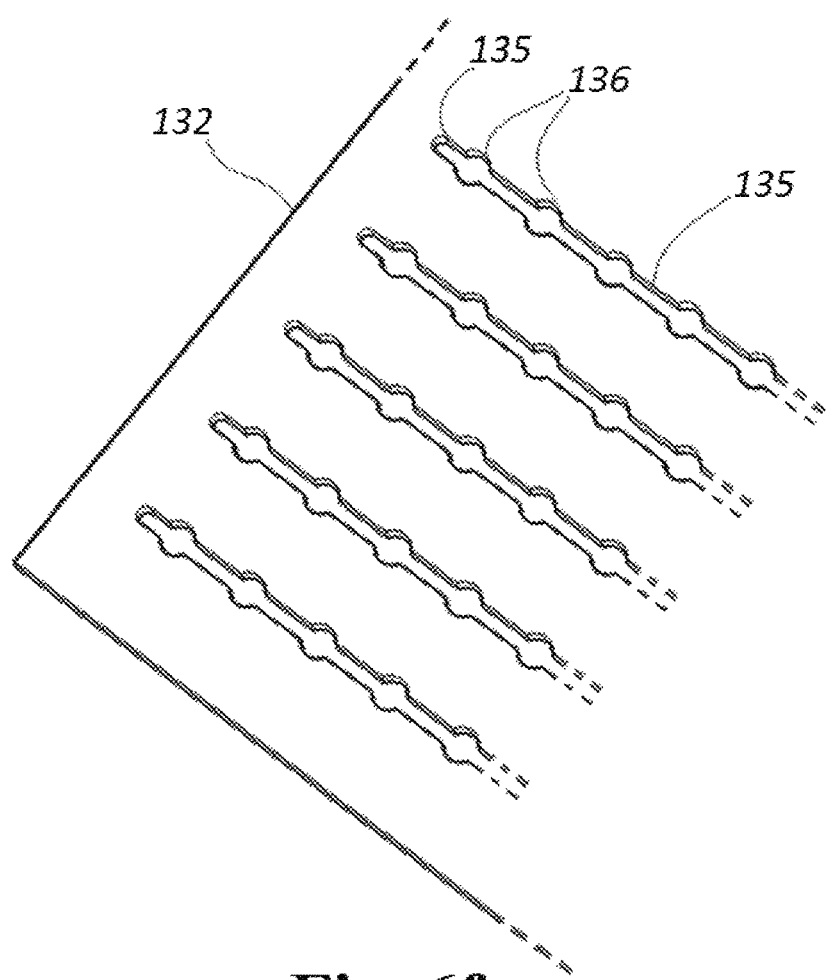
FIG. 6f shows an alternative embodiment of a latch plate in accordance with the invention.

FIG. 6f shows an alternative embodiment of a latch plate [132] in accordance with the invention. This version of a latch plate has a two-dimensional array of apertures having the second larger diameter [136] being connected along one array axis by long slots having widths equal to the first smaller diameter [135] and extending along said array axis past the first and last of the larger apertures of each row or column in that axial direction.

FIGS. 7a through 7d describe the operation of a stacked series of perforated boards and pegs as used in a floating pin form board assembly. In the description of this assembly and its operation, the word "pin" means substantially the same type of slender and typically cylindrical component referred to elsewhere in this specification using the word "peg." Also, the embodiments of FIGS. 6a through 6f and 7a through 7e have different features and components for defining an extended pin position and a retracted pin position, within which each floating pin may be individually locked in a position.

A floating pin form board assembly in accordance with the invention comprises a stack of pegboards each having holes spaced on a two-dimensional array. Although the hole diameters of each pegboard may vary, the set of pegboards are held in a frame so that the centers of all arrays of holes are aligned. In FIGS. 7a through 7d the vertical spacing between the pegboards and the lengths of the pegs or pins are exaggerated so that the operations of the system can be illustrated more clearly.

Figure 7A:
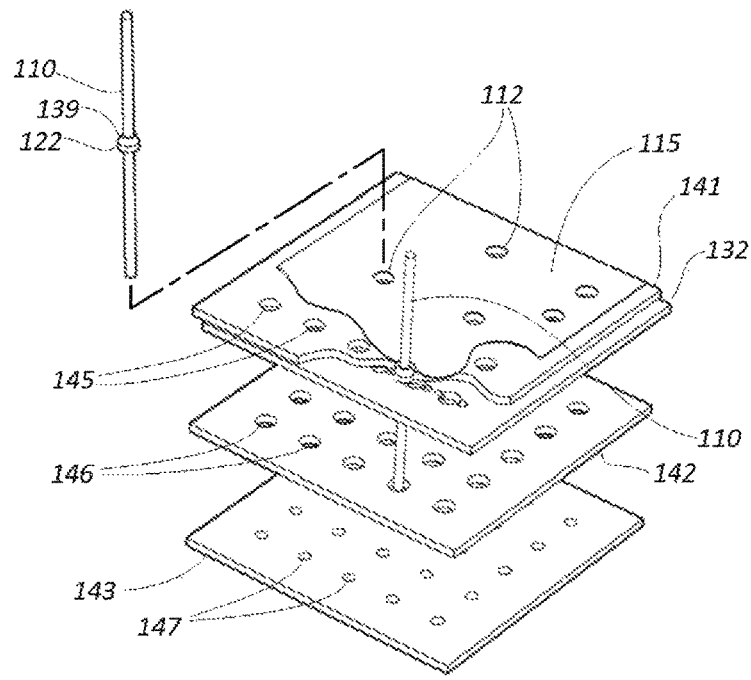
FIG. 7a shows a form sheet, a stack of pegboards, pegs, and a latch plate as used in a floating pin form board assembly in accordance with the invention.

The universal wire harness board, situated on the work bench or incorporated into it, comprises a floating pin form board assembly, with mylar sheets that include pre-punched hole locations for routing wires according to wire harness design specifications. The universal wire harness board, or universal wire form board assembly, may include a plurality of floating pins arranged in an array. FIG. 7a shows a form sheet, a stack of pegboards, pegs, and a latch plate as used in a floating pin form board assembly in accordance with the invention. The form sheet [115] is a flexible membrane that includes pre-punched holes [112.] This sheet is used in place of typical wire dressing form boards used in conventional wire harness manufacturing. Because mylar sheets are much thinner and much lighter than either the Masonite or plywood sheets of typical form boards, they can be stored much more densely such as in cabinets designed for large-format printed sheet articles such as maps or large mechanical drawings or blueprints. Cost savings and advantages include a substantial reduction in storage space, reduced set up time to start an assembly process, and that the duplication of sheets for larger order requirements can also be completed using less time and at reduced material costs. Compared with stacked storage of form boards having permanently mounted pegs which must be spaced apart by at least the thickness of the board plus the protruding length of the pegs mounted thereupon, a stack of mylar sheets can be stored in flat-drawer furniture at a storage density improvement of hundreds if not thousands of sheet documents for every one typical form board stored in conventional shelving.

A floating peg [110] in accordance with the invention has a first diameter over most of its length and a toroidal or cylindrical feature called a stop feature or a bead [122] having a larger diameter positioned somewhere along its length. The feature can be an integral part of the peg or it can be a discrete component affixed to it such as the snap ring of FIG. 6d. Because making a floating peg by lathe turning a large diameter stock to reveal a bead feature of the second larger diameter and turning the peg down to its first smaller diameter over the rest of its length would create a lot of waste material in the form of lathe chips, it may be preferable to secure rods of the first diameter and affix beads made from separate stock. The bead may have a chamfer [139] or one or more fillets to ease its motions during the setup and take-down phases of a form board.

Pegboards are available in a number of standard array spacings and 1-inch and 2-inch spacings are readily available in the USA. Pegboard is also called perforated hardboard, and in this specification "pegboard" means any sheet material of plastic, metal, or plywood, or similar sheet material, further comprising a linear or two-dimensional array of perforations or apertures cut into it at regular intervals or at predetermined locations.

Although in practice pegboards are available in 4 foot by 8 foot sheets, and 30 inch by 40 inch boards are common as fixtures for wire harness assembly work, in the illustrations of FIGS. 7a through 7h a small, 5 by 5 array is shown so that the components and operations can be seen more clearly.

In an embodiment shown in FIG. 7a, first, second, and third pegboards [141,] [142,] and [143] are arranged in a stack with their congruent aperture arrays aligned. A solid floor board not shown in this figure may reside below the third pegboard, or in an alternative embodiment the apertures of the third pegboard are blind apertures. In another embodiment, a non-perforated sheet is affixed to the underside surface of the third pegboard. Apertures [145] in the first pegboard and apertures [146] in the second pegboard are larger than the second diameter of the beads of the floating pegs. The apertures [147] of the third pegboard are similar to and preferably a little larger than the first diameter of the floating pegs. However, in an alternative embodiment in accordance with the invention, the apertures in the second and third pegboards may be smaller than the bead diameter so that when dropped into place (as seen in FIG. 7c) the pegs will rest atop the second pegboards on their beads. This kind of embodiment may be acceptable if the beads do not interfere with the work of dressing the wires around the pegs.

A latch plate [132] is positioned between the first and second pegboards. The latch plate has an array of apertures which are similar in size to those of the first and second pegboards so that if aligned, the bead of a peg may pass through all three of these apertures. However, at this step the latch plate is positioned with its array of larger apertures displaced in a sliding direction and out of alignment with the pegboard aperture arrays.

Figure 7B:
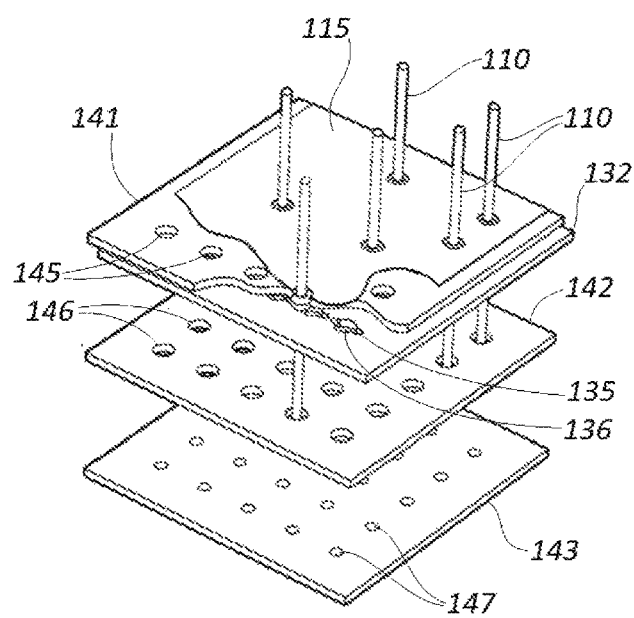
FIG. 7b shows a step of populating pegs according to a configuration of apertures in a firm sheet.
Figure 7C:
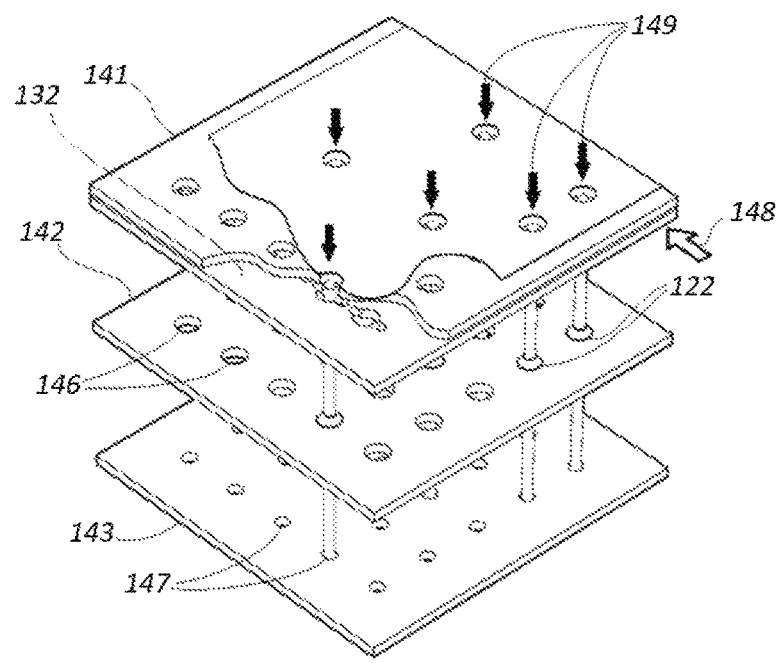
FIG. 7c shows the floating pins dropping into position as the latch plate slides into a peg release position.

FIG. 7b shows a step of populating the pegs [110] according to a configuration of apertures in a form sheet. After the steps of providing and aligning the pegboards and positioning the latch plate, a perforated form sheet [115] created for the specific wire harness product to be produced is lain atop the first pegboard [141.] When properly positioned, all the apertures on the form board align with apertures in the aligned pegboards. Apertures in the mylar sheet are also larger than the bead diameter of the pegs. In the next step, a peg is deposited in each of the holes in the mylar sheet. The slender section of the peg will pass through narrower portions [135] of the apertures in the latch plate [132] but the bead will not, so each peg rests upon the latch plate by its bead. The aperture arrays [145,] [146,] and [147] of the pegboards [141,] [142,] and [143] respectively are aligned. In this step, the array of larger apertures [136] in the latch plate remain displaced along a sliding direction and remain out of alignment from the pegboard arrays.

FIG. 7c shows the floating pins dropping into position as the latch plate slides into a peg release position. At this step, the latch plate [132] is slid along a sliding direction illustrated by arrow [148.] The array of larger apertures of the latch plate now come into alignment with the pegboard apertures arrays and reside directly beneath the bead features of the pegs. Thus the latch plate can be used so that each floating pin may be individually locked in an extended position or a retracted position. Dropping motions of the pegs are illustrated by the arrows [149.] The bead features drop through the first pegboard [141] so that the bottom tips of the pegs enter and seat into the aperture array [147] of the third pegboard [143.] The pegs may rest upon a floor beneath the third pegboard, or in the apertures of the third pegboard, according to an embodiment wherein these apertures [147] are blind apertures. The second pegboard [142] is positioned between the first and third pegboards so that its apertures [146] embrace the circumferences of the beads [122] of the pegs.

It is also hereby understood that it may be preferable that the pegboards are spaced apart at appropriate heights so that bead features of the pegs are located at a midpoint of the length of the pegs, that the bead is axially symmetrical with regard to chamfers or other lead-in features, which in this specification means that the bead is located at a midpoint of the length of a peg, and the bead defines a central plane of symmetry from which both ends of the pegs extend equally, and the peg ends are also equally rounded. With such a peg, either tip may be inserted into the pegboard holes and the process would proceed to an equal outcome. Axially symmetric pegs eliminate the "wrong" tip from being inserted, that is, they eliminate a lost time event of a worker inserting a peg, realizing that the peg has been inserted the wrong way, and then having to pull out the peg, reverse it, and reinsert the peg.

Figure 7D:
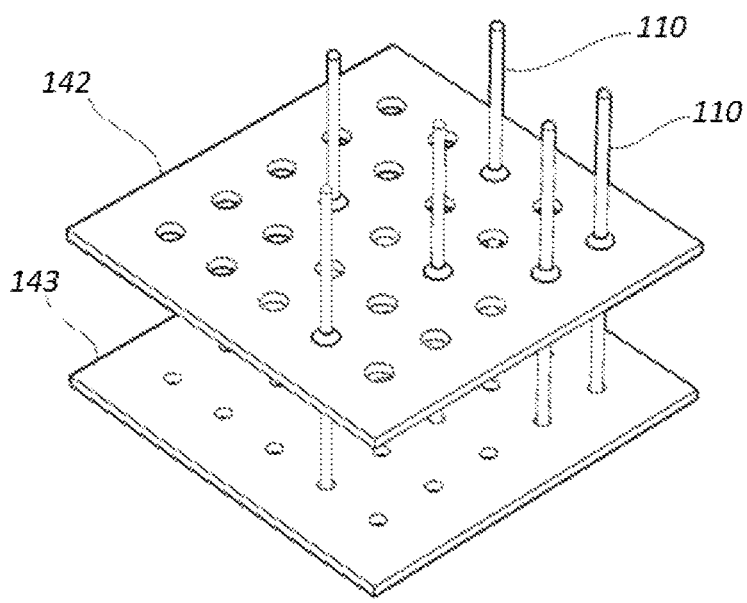
FIG. 7d shows an optional step of removing the first pegboard leaving pegs standing proud in the second pegboard.

FIG. 7d shows an optional step of removing the first pegboard leaving pegs [110] seated in the third pegboard [143] and standing proud in the second pegboard [142.] Also optionally, the form sheet may be placed onto the second pegboard so that graphics and indicia on the form sheet can guide the assembly work to be done. Alternatively, the form sheet may be positioned or suspended elsewhere in good view of the assembly workers if required. Also alternatively, instructions, indicia, and graphics can be displayed on any of the display monitors in the work cell to direct the assembly work.

Figure 7E:
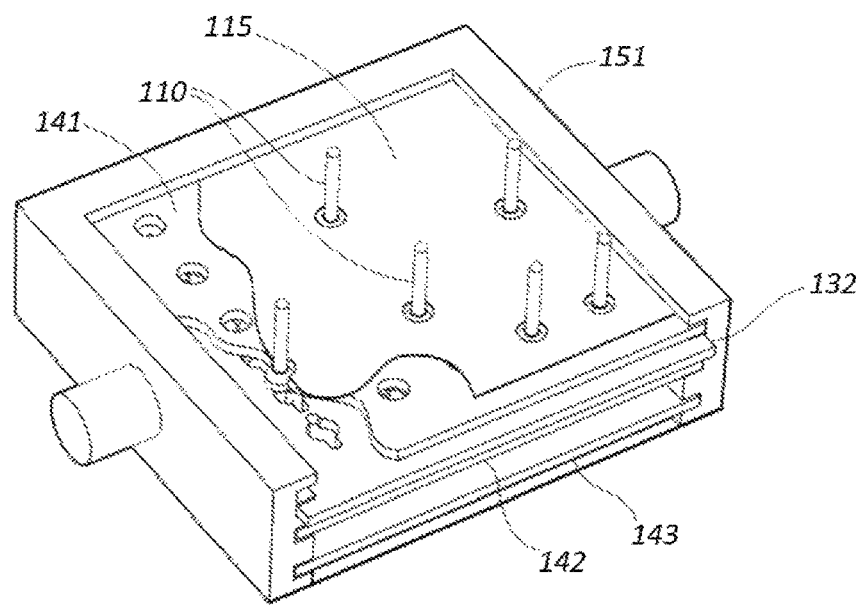
FIG. 7e shows an embodiment of the floating pin form board assembly having a frame with slots for peg boards and floating pin latch plate in accordance with the invention.

FIG. 7e shows an embodiment of the floating pin form board assembly having a frame [151] with dado grooves for receiving peg boards [141,] [142,] and [143,] and a floating pin latch plate [132] in accordance with the invention. As described previously, a form sheet [115] is lain atop the first pegboard [141] and aligned so that its apertures align with apertures in the stacked pegboard arrays. Pegs [110] are then deposited into the aligned apertures. The latch plate as shown in this figure is in its displaced position so that the inserted pegs remain raised in the form board frame.

Figure 7F:
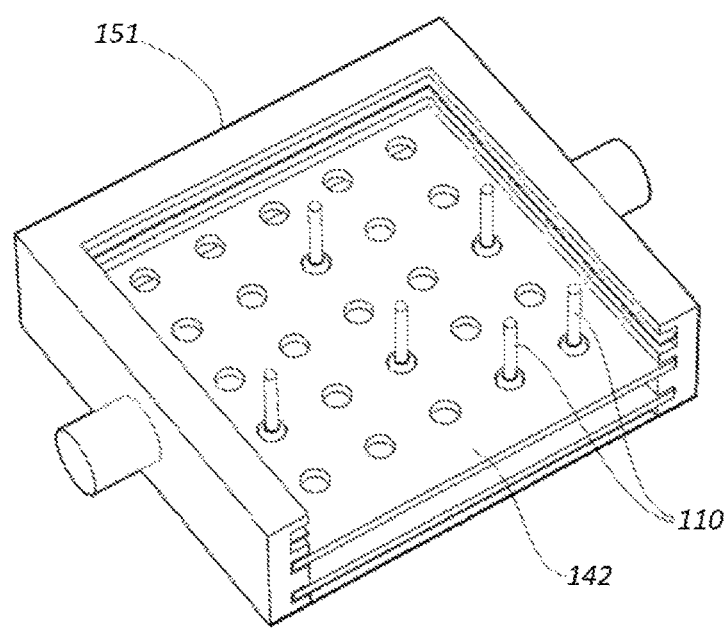
FIG. 7f shows the frame assembly of FIG. 7e with the form sheet and latch plate removed.

FIG. 7f shows the frame assembly [151] of FIG. 7e with the form sheet and latch plate removed. The second pegboard [142] is positioned so that its apertures embrace the circumferences of the bead of the pegs [110.] The assembly may be used in this configuration as a form board, and the form sheet may be optionally placed atop the second pegboard, especially if indicia, other graphics, or texts offer assembly instructions to which a worker may refer while assembling a wire harness.

Figure 7G:
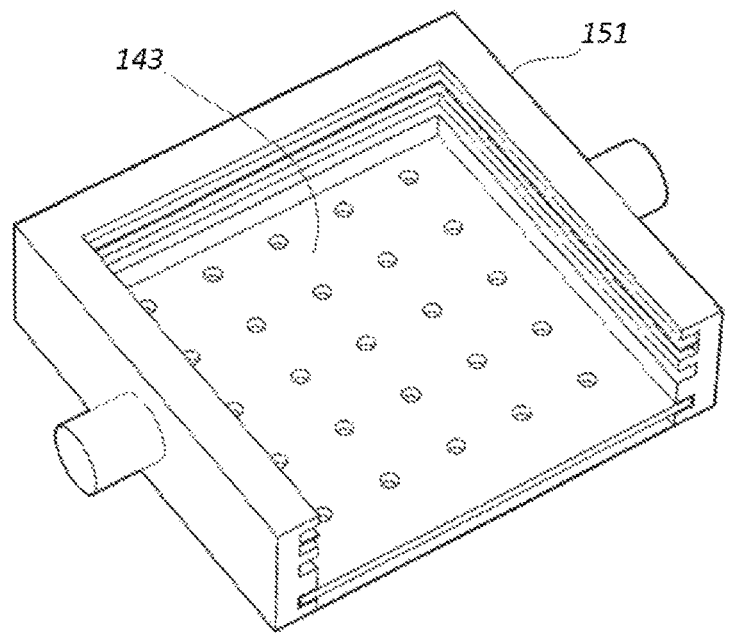
FIG. 7g shows the frame assembly with only the third pegboard in place and other components removed for clarity.

FIG. 7g shows the frame assembly [151] with only the third pegboard [143] in place and other components removed for clarity. The slender tips of floating pegs may pass through the apertures of the plate and rest on the floor of the frame, or alternatively, the third pegboard may comprise an array of blind apertures or countersunk or counterbored apertures or the like to receive the peg tips.

Figure 7H:
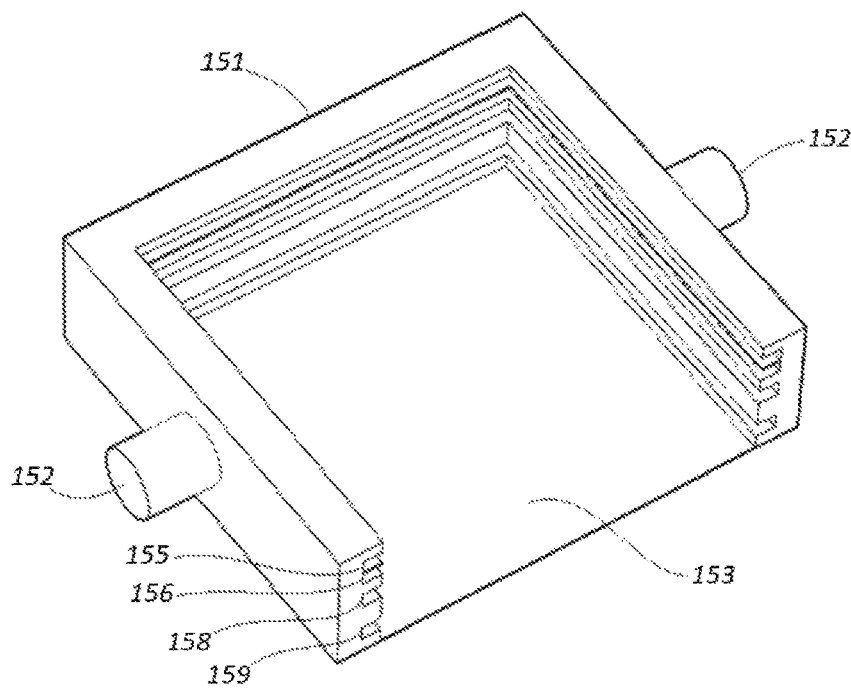
FIG. 7h shows the frame assembly with all other components removed.

FIG. 7h shows the frame assembly [151] with all other components removed. The frame assembly includes a pair of coaxially located trunnions [152] so that the frame may be rotatably coupled to a work bench by these trunnions, and so that when a particular production run using one configuration of pegs is complete and it is desired to configure the floating peg form board for a different production run, the frame assembly can be flipped over so that the pegs fall out into a collection box or the like. This figure also shows the floor [153] of the frame assembly, and a set of dados which receive the pegboards and the latch plate. In this figure, dado [155] receives the first pegboard, dado [156] receives the latch plate, dado [158] receives the second pegboard, and dado [159] receives the third pegboard. Of the second and third pegboards, either or both may be permanently mounted to the frame [151.] According to another alternative embodiment, dadoes [155] and [156] may be combined into a single dado groove wide enough to accommodate the first pegboard and an underlying latch plate as a single sandwich.

According to another embodiment of a frame assembly in accordance with the invention, by rotating this floating pin board assembly 180 degrees (i.e, tipping it over by its trunnions) with the pre-punched form sheet in place, the floating pins protrude through the form sheet holes and may be locked into an extended position by sliding the latch plate in its sliding direction. Once the assembly form board is rotated back 180 degrees, an operator has available a wire harness pin board ready for use to assemble and route wires to specific dimensional requirements.

Figure 8:
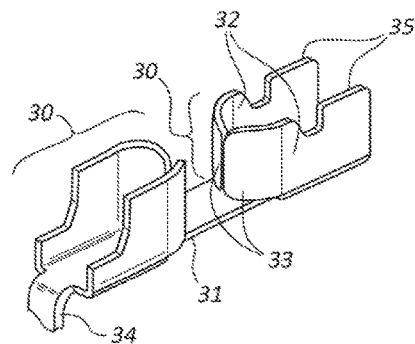
FIG. 8 shows an IDT terminal structure in accordance with the parent application.

FIG. 8 shows an IDT terminal structure in accordance with the parent application Ser. No. 16/022,496. The terminal has two opposed cleats [30] facing each other, and each cleat comprises a pair of arcuate beams [33] extending from cantilevers [32.] The beams are formed together to meet at their tips with a pinching preload. The opposed cleats arise from a central strip [31] which may extend past one or both cleats to form a contact tail [34] as described in the parent application. A portion of a cleat can also include crimp wings [35] for a redundantly secure grip on an inserted wire.

FIG. 9 shows a tail section [34] of a terminal, a contact, or a terminal carrier strip having a notch [39] indented or skived into the material. This feature is used so that slight flexing of the contact tail or carrier strip will rupture or shear through the rest of the material below the notch, allowing the terminal to crack free from a carrier strip, a pilot strip, or from the next terminal of a continuous line of attached end feed terminals.

Figure 10:
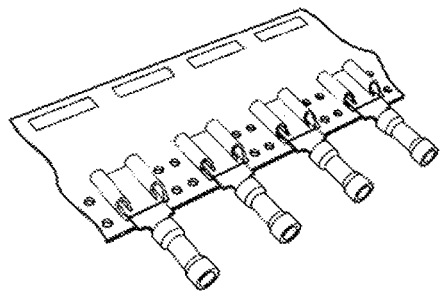
FIG. 10 shows a series of mylar tape mounted insulated terminals.

FIG. 10 shows a series of mylar tape mounted insulated terminals. Conventional application tooling configured to process these terminals may be located in one of the universal press locations to offer a quick change applicator tool process.

Figure 11:
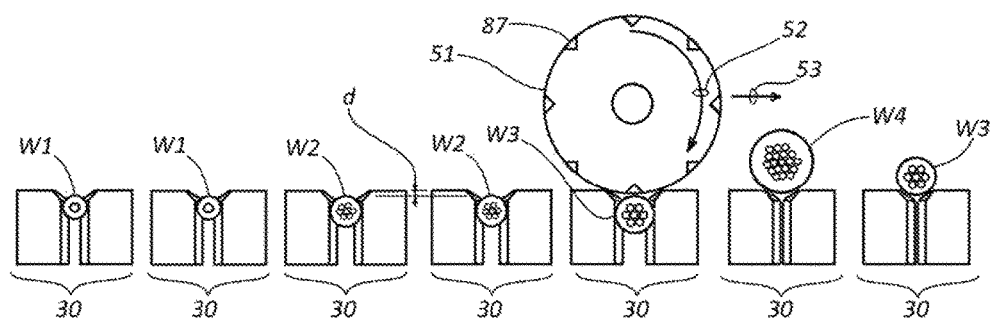
FIG. 11 shows a mass termination apparatus including an indented roller wheel.

FIG. 11 shows a sequential termination apparatus and method using an indented roller wheel [51] in which the length of arc between indentations [87] on the wheel is analogous to the terminal pitch, or linear dimension p0 as explained above. In this figure arrow [52] shows a rotation direction of the roller wheel and arrow [53] shows a translation or linear motion of the roller wheel. A line of opposed-cleat IDT terminals [30] may be part of a linear array of contacts for a cable headshell or a line of terminals mounted along or near a PCB card edge, where the PCB may transmit and receive signals, data, or commands through smaller wires [W1] and [W2,] and may be energized or supply power to higher-current devices through larger wires [W3] and [W4.]

The installation proceeds by laying wires atop the IDT connectors at their appropriate pitches and locations. The wires need only be cut to length and need no further preparation; stripping or tinning are eliminated by the IDT terminal design. A wheel, used for sequential termination of wires into an array of opposed-clamp terminals such as of the parent application Ser. No. 16/022,496, only needs one depth control for all wires onto which it acts. The roller crimp may be used on all opposed-cleat IDT terminals and connectors described in the parent application.

FIGS. 12a through 12d show a wire termination process for IDT terminals described in parent application Ser. No. 16/022,496 which are amenable when such terminals are arranged as end feed terminal strips. Compared to conventional terminals, each IDT terminal in accordance with the parent application may accept a wider range of wire sizes than most conventional terminal designs, and allow a single terminating tool to operate more universally, which means fewer change-outs and reduced tooling inventory. Both of these benefits reduce maintenance time, overhead labor costs, and quality control documentation, and all of these factors directly reduce wire harness unit costs produced using work cells in accordance with the invention.

First, as shown in FIG. 12a, a wire [184] is positioned in line with and bridging both opposed cleats of the IDT terminal. A locator [181,] which may be spring-loaded, and a seating punch [182] are staged above the terminal [185] and wire [184.] Next in FIG. 12b, the locator [181] descends and stabilizes the cleats of the terminal. The seating punch [182] remains in its raised, or staged position. The locator is sized so that its inner walls bestride the cleats of the IDT terminal and so that the cleats can only open by flexing the arcuate portions of their cantilever beams. The straight sections of the cleats are stabilized and prevented from bowing open (sometimes called 'boat flare') while the locator is in place. The locator does not need to descend to or touch upon the work surface beneath the terminals. Stabilizing the upper one-third or two-thirds height of the terminal may be sufficient to prevent 'boat flare.'

With the locator [181] in place, in FIG. 12c the seating punch [182] presses the wire [184] into the cleats from above. Insertion depth is controlled by the tooling. Wires of all diameters accepted by the IDT terminal will be inserted to the same depth as measured from the top edges of the terminal cleats.

Finally in FIG. 12d, the locator [181] and seating punch [182] are both raised clear of the terminated wire and terminal. Another advantage of the IDT terminal design seen in this figure is that as long as an appropriate insertion depth "d" is achieved, (as measured from the top edge of the cleats to the top of the wire,) then a wider range of wire sizes can be terminated for each size of IDT terminal made in accordance with the parent application. Thus for a given range of wire sizes, especially 28AWG up through 14AWG, fewer part numbers are required to span the effective production range. The number of different part numbers to be inventoried and inspected is reduced, and the tooling inventory and maintenance associated with each terminal size is also reduced.

Furthermore, because the IDT terminal of the parent application only requires a few pounds of force per terminal, tooling wear is reduced, which is another source of production cost savings because heavy machinery and high forces are not required. A manual lever or a light motor can operate this compression tooling. Energy costs are reduced and worker safety is improved because the hazards associated with flywheels and high compression force machinery are eliminated.

Figure 13A:
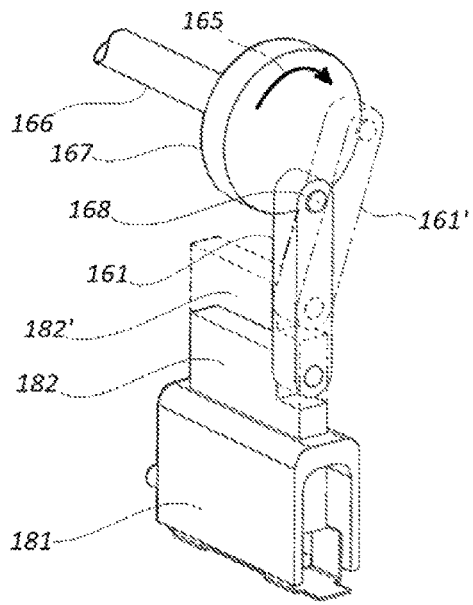
FIG. 13a shows an embodiment of a wire insertion mechanism for IDT terminals.

FIG. 13a shows an embodiment of a wire insertion mechanism for IDT terminals. The motions described in FIGS. 12a through 12d may be accomplished using a slider crank mechanism illustrated in this figure. The slider crank is a type of four-bar linkage which includes three revolute couplings and one prismatic coupling, that is, one coupling allowing only linear translation of one component with respect to another. In this case, the seating punch [182] moves prismatically with respect to the locator [181.] A link [161] connects an eccentric pin [168] mounted on a drive wheel [167] connected to a powered shaft [166.] Arrow [165] depicts a rotary motion whereby the seating punch may descend from a raised position [182'] with the pin at or near a three o' clock position on the drive wheel and the link in an alternate position [161'.] A larger excusion is possible when cycling the pin from a twelve o'clock position to a six o' clock position. The six o' clock position drops the seating punch onto the wire and forces it into the IDT terminal. The cleats of the terminal lacerate the wire jacket and establish a robust electrical and mechanical interconnection.

Figure 13B:
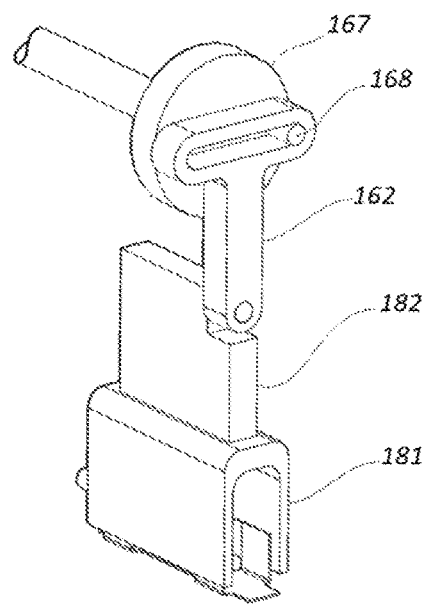
FIG. 13b shows an alternative embodiment of a wire insertion mechanism for IDT terminals.

FIG. 13b shows an alternative embodiment of a wire insertion mechanism for IDT terminals. IN this embodiment a Scotch yoke mechanism may be used to raise and lower the seating punch [182] while the locator [181] is in position to prevent 'boat flare' of the IDT terminal cleats. The Scotch yoke eliminates rotational motion between its slotted yoke [162] and a connecting pin on the seating punch. Such a pin may also be called a wrist pin or a gudgeon. The junction between the seating punch and the yoke may now be constructed as a permanent or immobilized mechanical connection, or alternatively the seating punch may comprise a transverse slot operated by the pin [168] on the drive wheel [167.]

Figure 14A:
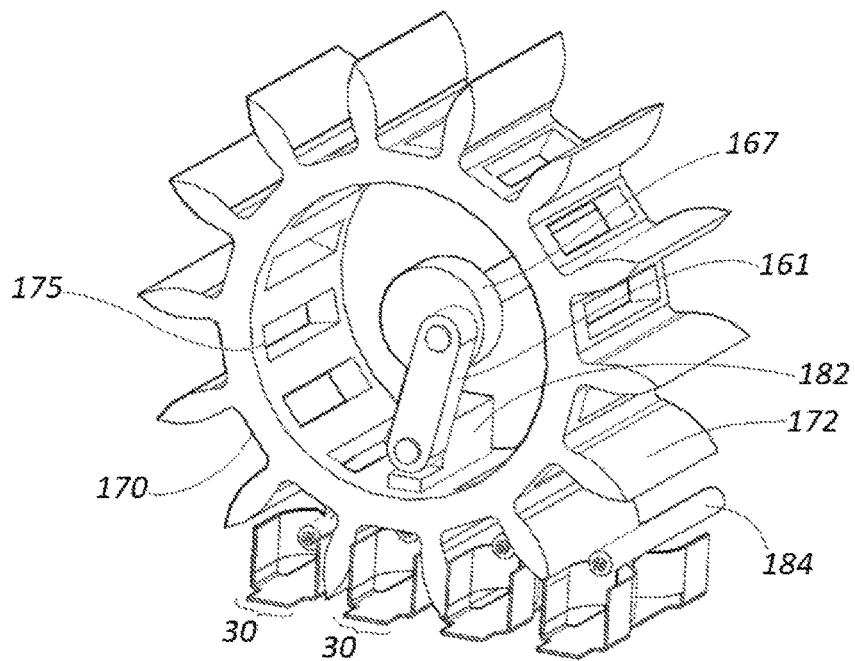
FIG. 14a shows an embodiment of a roller crimp termination mechanism in accordance with the invention.

FIG. 14a shows an embodiment of a roller crimp termination mechanism in accordance with the invention. The mechanism shown includes a sprocketed roller wheel [170.] The wheel is designed to pass along a linear array of IDT terminals [30] each having wires [184] lain atop them for seating by a seating punch [182.] A crank shaft with a drive wheel [167] and an eccentric pin is connected by a link [161] to a pin on the seating punch. The seating punch is constrained to only vertical motion by a housing (not shown) which contains the slider crank mechanism. The roller wheel [170] includes sprocket teeth [172] designed and shaped to fit between the spaced apart terminals and which is rotatably coupled to the roller crimp machine [88 of FIG. 2.] Lateral motion of the roller crimp machine along a line of terminals will induce the sprocket wheel to rotate. The sprocket teeth enter between adjacent terminals and they may, but they do not need to, seat upon the work surface. While the roller crimp machine is positioned with the seating punch directly atop a wire and IDT terminal to receive the wire, the terminal cleats are restrained from 'boat flare' by contact with sprocket teeth surfaces on both sides of the terminal. With the roller stopped directly over a terminal and wire, the slider crank can be cycled to drop down and retrieve the seating punch. The seating punch travels through one of a radial array of slots [175] included in the sprocket wheel. Linkage geometry is designed so that the raised position of the seating punch is held above the slots of the sprocket wheel so that it can roll freely as the crimp machine moves laterally to the next terminal and wire to be connected.

Figure 14B:
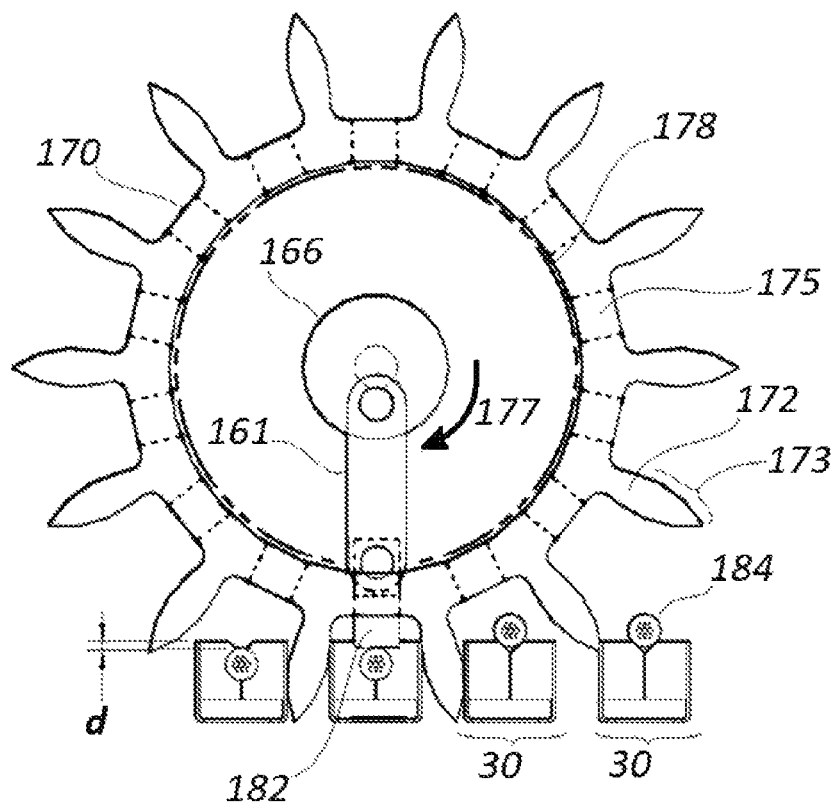
FIG. 14b shows an alternate view of an embodiment of a roller crimp termination mechanism in accordance with the invention.

FIG. 14b shows an alternate view of a roller crimp termination mechanism in accordance with the invention. A housing containing the slider crank components is represented by phantom line [178.] The sprocket wheel [170] is rotatably coupled to the slider crank housing. The crank shaft [166] drives a link [161] which is pinned to a seating punch [182,] which is constrained to vertical motion by features of the housing and may also be further constrained by close fitting walls of the radial slots [175] in the sprocket wheel through which it passes when descending to seat a wire [184] into an IDT terminal [30] of the parent application Ser. No. 16/022,496.

During a seating punch or press operation, the wheel is held stationary over the wire and terminal to be worked on. The sides of the cleats of the IDT terminal are restrained from unwanted outward deflection ('boat flare') by the surfaces of the sprocket teeth [172] which bestride the cleats. The face width of the roller wheel is long enough to retrain both cleats of an IDT terminal in accordance with the parent application. The slider crank mechanism is cycled by one revolution of the crank shaft, or a partial revolution as shown by arrow [177] may be sufficient for the seating punch to seat the wire and then return to a staged position clear of the slots in the sprocket wheel. For the teeth to enter between and the spaced apart terminals and to depart with equal ease, at least a portion [173] of the sprocket teeth may include a revolute profile, as opposed to involute profile of teeth which are used for rotary power transmission between meshed gears. A revolute profile may be designed or selected to abut the sidewalls of the cleats or to pinch slightly upon them if a preload is preferred for wire insertion into the IDT terminal.

Insertion depth "d" in this operation will be the same for wires of all diameters seated in a single linear progression of terminations, and this insertion depth can be controlled or adjusted by the geometry of the slider crank components or by the height of the roller mechanism as maintained by its attachment mechanism to the top of the side walls [87 of FIG. 2] built onto the work bench [103 of FIG. 2.]

Thus a flexible and universal wire harness work center as described may be advantageously employed to manufacture many different types of wire harness assemblies where discrete wires of multiple gauge sizes are pulled or otherwise delivered from bulk storage containers and then processed to individual finished specifications for wire, and assembled into a finished wire harness which is then electrically tested and then removed from the work center for delivery to OEMs and other customers. Additional benefits include enabling expanded use of IDT connectors in discrete wire harness assemblies featuring mass termination of multiple variations of wire gauge sizes into individual multiple position connectors, and improved methods of wire management in the handling of wires, and reduction of in-process time for finished wire components placed in a discrete wire harness assembly product, and significant cost savings of completed wire harness assemblies. Also as stated previously, the capability for handling type "N" wire is a feature of the invention that allows multiple pulls of wires onto the form board floating pin work plane.

By using multiple pulls of wires from one side wall section to another side wall section, then once dressed around their form board pins, specific wire lengths for all wires are established simultaneously at all positions where mass terminations will occur next.

The form board assembly system of using locked-in floating pins and pre-fabricated form sheets with defined pinhole locations is a feature of this work center invention that eliminates excess storage space typically required for wire harness plywood form boards. As mentioned elsewhere, in comparison to the space required to store numerous plywood form board products, pre-punched form sheets in accordance with the invention can be stored in conventional file drawer cabinetry, and on a basis of unit volume of storage cabinetry or shelving, many times more product designs may be stored as stacks of membranes in comparatively flat drawers than can be stored as stacks of rigid boards having mounted pegs, or than can be stored as stacks of perforated boards of any substantial thickness.

The separate wire inventory control indexing table also herein called a programmable discrete wire inventory retainer, having a programmable selection of wires available for producing specified wire lengths by single or dual wire pulls of a shuttle, combined with selective instructions for cut to length wires, wire stripping at wire ends or at intermediate points along a wire length, are all design features of a wire harness work center in accordance with the invention. The ability to provide programmable selections of single or dual wire processing is a feature that reduces the in-process time used for wire handling during the sequence steps for building and completing discrete wire harness assemblies.

The ability to electrically test completed wire harness assemblies at the work center may reduce the cost of waste and human errors due to misplacement of terminated wires into incorrect positions within electrical connectors, and may also reduce time consumed in moving wires from one location to another, thereby lowering manufacturing costs of completed wire harness assemblies.

OEMs and customers may change their specifications and requirements at any time, such as in response to a finding in a quality audit downstream in the material supply chain from wire harness assembly and procurement. In-process changes in wire length due to altered requirements or even impromptu deviation requests can easily be accommodated within a work cell in accordance with the invention, and may only require a simple change of one or a few process steps stored in the production control computer of the work cell, such as to change some wire lengths while a wire harness assembly is going through a given sequence of wire prep, wire termination, and wire configuration on a harness board floating pin frame.

One of the more onerous in-process changes in wire harness production is when an OEM or customer requires that a short wire be made longer in an already completed wire harness assembly. Without the advantageous work cell, a major retrofit of removing the short wire from the wire assembly and installing the replacement longer wire is required. In some cases, the cost of retrofitting may be more expensive than scrapping the whole wire harness assembly. If a minor deviation request arrives in advance of its manufacturing step, then a work cell and equipment configured in accordance with the invention may allow more opportunities for wire lengths to be changed "on the fly" and may avoid an undesirable outcome where the costs of scrapped cables plus the revised cables must be borne by the price of just the revised cables, or of not, then a contract may require that a conventional work center would have to produce replacement products at a financial loss.

The overall manufacturing space required using a cluster of four symmetrical work cells in accordance with the invention requires about a 1,000 square foot area, as opposed to a much larger square foot area typically needed in a conventional wire harness manufacturing layout. An approximate estimate of space savings is within a range around a 900% for manufacturing the same wire harness assembly product. Additional improvements in lowering the in-process time elements of managing wire components will result in a lower labor requirement. Also, since universally configurable wire and termination equipment capable of producing to OEM or customer requirements are all present within a work cell in accordance with the invention, there will be fewer instances where in-process material must leave the cell to be processed at dedicated equipment stations outside of or remote from the work cell, or remote locations within the manufacturing facility.

Lastly in the figures, a description of an automatic or semi-automatic IDT terminating machine is presented as described in the parent application Ser. No. 16/022,496 for reference. FIG. 15 shows an abstract depiction of an IDT terminator applicator machine [89] in accordance with the invention, in its context of a wire harness manufacturing station. The machine includes a motor [2] typically including or operatively connected to a flywheel or other rotating mass which stores and provides rotational inertia during an operating cycle.

Application tooling specific for the cable to be made provides an intermittent wire holding and feeding system [5] and specific tooling [6] to "wire cut and stuff" flying leads, braided cable, ribbon cable or other forms of electrical conductors typically provided in bulk spools. Connector contacts or terminals can also be provided in bulk spools.

Spools of bulk wires [91] of various gauges and colors, or fairlead pulleys guiding wire from bulk storage spools, skeins, or boxes are passed through a side wall [87] or back wall of the machine. Because cutting, trimming and terminating operations often fling clipped wire ends and other debris at random, the side wall or back wall helps confine such debris to the vicinity of the assembly station and prevents foreign matter from contaminating the bulk cable sources. The application tooling mounted on the side wall shown is designed for mass terminating wires after a plurality of these wires have been manually and individually dressed around form board pins located on form board [17] to their end location positions (not shown.) The mass termination cycle in this figure will initiate when all wires pulled through a wall [87] have been placed at their final end positions.

In some machinery designs, a clamping system aligns a set of terminals to an arrangement of wires taken from the bulk supply [91] and in a single action of compression the contacts are electrically bonded to and crimped into their terminals while the wire is simultaneously parted off its bulk supply, leaving a set of trimmed ends [9] available to begin building the other end of the next cable harness [14] to be made. The trimmed ends [9] remain clamped in the shearing tools which effect the cutoff. The previously terminated wires are pressed into a headshell or cable end connector [12] by the excursion or stroke of the machine, and the cycle is repeated for the next cable to be built.

The combination of a side wall through which wires are fed from bulk stores and an automatic or semi-automatic IDT terminating machine which is adapted to traverse along the top of the side wall is called a "multiple wire pull-through mass terminator." When a set of wires are positioned atop a complementary set of IDT terminals in a connector headshell or another device to be electrically coupled to a wire harness product being built, the IDT terminating machine may be used to mass terminate the set of wires in a single, time saving operation. Mass termination machines may also include a wire cutoff tool which operates in tandem with the mass termination stroke so that when the machine cycles, wires are inserted into IDT contacts for electrical connections and then trimmed to length. Since the plurality of wires for the set of terminals may be grasped as a group and pulled through the side wall in a single act, this operation is called a "multiple wire pull-through."

Another labor saving step is to assemble the wires into their cable end connector while it is mated to a complementary connector [11] which holds signal lines [15] so that diagnostic tests can verify that acceptable connections have been made and even test other components incorporated into the cable at this point in the assembly process. For example some cables include in-line active or passive electronic components such as dropping resistors or impedance matching circuits, and these can be energized and analyzed for correct function. Non-conforming material can be detected and excluded from the assembly process for rework, salvage, or scrap.

Cable terminating tooling as described above is usually located at the periphery of a peg board template or wire harness assembly platform [17] that allows an assembler to pull lengths of wire from bulk sources, arrange the wires and cables into a harness, and then assemble connectors and headshells onto the various ends of the harness using the terminating tool. As the wires are arranged in a cable end connector or headshell having IDT contacts, all the wires can be mass terminated in one operation.

While certain features and aspects have been described with respect to exemplary embodiments, one skilled in the art will recognize that numerous modifications are possible. Also, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems. Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise.

Consequently and in summary, although many exemplary embodiments are described above, it will be appreciated that the invention is intended to cover all modifications and equivalents within the scope of the following claims.

What is claimed is:

1. A wire harness assembly work cell, comprising:
   a production control computer,
   bulk supplies of wire,
   a programmable discrete wire inventory retainer capable of cutting and of stripping wires passed through the same,
   a table having a sloped surface comprising a lower edge, and a trough affixed to said lower edge,
   a shuttle configured to grab at least one wire presented to it by said programmable wire inventory retainer, and to move to a predetermined distance from said programmable wire inventory retainer on command from said production control computer, and
   a work bench further comprising
      a universal wire harness board,
      a programmable mass terminator tooling unit for cutting wire,
      a floating pin form board assembly positioned to interface with first and second IDT connectors;
      wherein said floating pin form board assembly comprises a plurality of floating pins arranged in an array and defines an extended pin position and a retracted pin position, within which each floating pin may be individually locked in a position.

2. The wire harness assembly work cell of claim 1, further comprising a video display monitor connected to said production control computer.

3. The wire harness assembly work cell of claim 1, further comprising a console for receiving commands for overriding automated assembly steps.

4. The configurable modular work space of claim 1, further comprising a discrete wire termination station configured to process a wire terminal selected from the set of wire terminals consisting of: an end feed terminal, a side feed terminal, a loose terminal, and a tape mounted terminal.

5. The configurable modular work space of claim 1, further comprising a computerized wire harness system controller.

6. The configurable modular work space of claim 1, wherein said work bench further comprises a side wall having a roller crimp sequential terminator mounted thereon.

7. The configurable modular work space of claim 1, wherein said work bench further comprises at least one receptacle for storing a component selected from the set of components consisting of: a terminal, a connector, a connector headshell, a screw, a lug, a wire, a tie wrap, and an identification tag.

8. A wire harness assembly work cell, comprising:
   a production control computer,
   bulk supplies of wire,
   a programmable discrete wire inventory retainer capable of cutting and of stripping wires passed through the same,
   a table having a sloped surface comprising a lower edge, and a trough affixed to said lower edge,
   a shuttle configured to grab at least one wire presented to it by said programmable wire inventory retainer, and to move to a predetermined distance from said programmable wire inventory retainer on command from said production control computer, and
   a work bench having at least one side wall attached thereto, and a roller crimp sequential terminator mounted thereon.

9. The wire harness assembly work cell of claim 8, further comprising a video display monitor connected to said production control computer.

10. The wire harness assembly work cell of claim 8, further comprising a console for receiving commands for overriding automated assembly steps.

11. The configurable modular work space of claim 8, further comprising a discrete wire termination station configured to process a wire terminal selected from the set of wire terminals consisting of: an end feed terminal, a side feed terminal, a loose terminal, and a tape mounted terminal.

12. The configurable modular work space of claim 8, further comprising a multiple wire pull-through mass terminator mounted to said side wall attached to said work bench.

13. The configurable modular work space of claim 8, wherein said work bench further comprises a universal wire harness board and a programmable mass terminator tooling unit for cutting wires to length.

14. The configurable modular work space of claim 13, wherein said universal wire harness board further comprises a floating pin form board assembly comprising a plurality of floating pins arranged in an array within which each floating pin many be individually locked in an extended position or a retracted position.

15. The configurable modular work space of claim 14, with said floating pin form board assembly is positioned to interface with first and second IDT connectors.

* * * * *